(12) United States Patent
Teegan et al.

(10) Patent No.: US 6,748,555 B1
(45) Date of Patent: Jun. 8, 2004

(54) OBJECT-BASED SOFTWARE MANAGEMENT

(75) Inventors: Hugh A. Teegan, Bellevue, WA (US); Scott R. Matsumoto, Andover, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/393,011

(22) Filed: Sep. 9, 1999

(51) Int. Cl.$^7$ ................................................ G06F 11/00
(52) U.S. Cl. ............................ 714/38; 714/47; 717/127
(58) Field of Search ............................... 714/38, 20, 39, 714/47, 51, 37; 709/224, 317, 317 BRS; 717/127, 131

(56) References Cited

U.S. PATENT DOCUMENTS

| | | | |
|---|---|---|---|
| 4,034,353 A | * | 7/1977 | Denny et al. ............... 345/440 |
| 4,231,106 A | * | 10/1980 | Heap et al. .................. 702/186 |
| 4,752,928 A | | 6/1988 | Chapman et al. |
| 4,800,488 A | | 1/1989 | Agrawal et al. |
| 4,953,080 A | | 8/1990 | Dysart et al. |
| 5,047,919 A | * | 9/1991 | Sterling et al. ............... 714/47 |
| 5,093,914 A | | 3/1992 | Coplien et al. |
| 5,125,091 A | | 6/1992 | Staas, Jr. et al. |
| 5,133,075 A | | 7/1992 | Risch |
| 5,151,987 A | | 9/1992 | Abraham et al. |
| 5,168,441 A | | 12/1992 | Onarheim et al. |
| 5,179,702 A | | 1/1993 | Spix et al. |
| 5,204,956 A | * | 4/1993 | Danuser et al. ............... 714/47 |
| 5,212,793 A | | 5/1993 | Donica et al. |
| 5,307,490 A | | 4/1994 | Davidson et al. |
| 5,313,616 A | * | 5/1994 | Cline et al. .................. 717/127 |
| 5,315,703 A | | 5/1994 | Matheny et al. |
| 5,442,791 A | | 8/1995 | Wrabetz et al. |
| 5,459,837 A | | 10/1995 | Caccavale |
| 5,485,574 A | * | 1/1996 | Bolosky et al. ............. 709/319 |
| 5,485,617 A | | 1/1996 | Stutz et al. |

(List continued on next page.)

FOREIGN PATENT DOCUMENTS

| | | |
|---|---|---|
| EP | 0559100 A2 | 9/1993 |
| EP | 0623876 A2 | 11/1994 |
| EP | 0638863 A1 | 2/1995 |
| EP | 0777178 A1 | 6/1997 |
| WO | WO98/02809 | 1/1998 |

OTHER PUBLICATIONS

IEEE 100: The Authoritave Dictionary of IEEE Standards Terms, 2000, Standards Information Network IEEE Press, 7$^{th}$ Edition, p. 691.*

(List continued on next page.)

Primary Examiner—Robert Beausoliel
Assistant Examiner—Gabriel Chu
(74) Attorney, Agent, or Firm—Klarquist Sparkman, LLP

(57) ABSTRACT

An execution environment accommodating object-based software transparently monitors interactions with software objects to generate operational management information for managing programs executing at plural computers. Notifications are directed to a software manager in the form of events, which can additionally be provided to applications or user programs. The software manager can group the events into sets and derive various operational management metrics from them to provide an overall picture of a program's performance, including availability. A hierarchical arrangement feature facilitates gathering information for programs scattered over plural computers. An alert feature provides warnings if metrics fall outside a specified threshold. In addition, the alert feature can automatically subscribe to additional sets of events to dynamically select the information collected by the software manager. Since the operational management information is collected transparently by logic outside the objects, manual instrumentation of the program is unnecessary, and software management technology is made available to organizations without software management expertise.

66 Claims, 16 Drawing Sheets

U.S. PATENT DOCUMENTS

| | | | | |
|---|---|---|---|---|
| 5,511,197 | A | | 4/1996 | Hill et al. |
| 5,517,645 | A | | 5/1996 | Stutz et al. |
| 5,519,863 | A | * | 5/1996 | Allen et al. ............... 709/318 |
| 5,519,867 | A | | 5/1996 | Moeller et al. |
| 5,524,238 | A | | 6/1996 | Miller et al. |
| 5,528,753 | A | * | 6/1996 | Fortin ...................... 714/35 |
| 5,539,907 | A | * | 7/1996 | Srivastava et al. ........... 703/26 |
| 5,548,718 | A | * | 8/1996 | Siegel et al. ................. 714/38 |
| 5,574,918 | A | | 11/1996 | Hurley et al. |
| 5,577,251 | A | | 11/1996 | Hamilton et al. |
| 5,577,252 | A | | 11/1996 | Nelson et al. |
| 5,579,520 | A | | 11/1996 | Bennett |
| 5,581,686 | A | | 12/1996 | Koppolu et al. |
| 5,581,760 | A | | 12/1996 | Atkinson et al. |
| 5,619,710 | A | | 4/1997 | Travis, Jr. et al. |
| 5,687,370 | A | | 11/1997 | Garst et al. |
| 5,689,708 | A | | 11/1997 | Regnier et al. |
| 5,732,273 | A | * | 3/1998 | Srivastava et al. ......... 717/128 |
| 5,752,038 | A | | 5/1998 | Blake et al. |
| 5,765,174 | A | | 6/1998 | Bishop |
| 5,787,251 | A | | 7/1998 | Hamilton et al. |
| 5,790,789 | A | | 8/1998 | Suarez |
| 5,794,038 | A | | 8/1998 | Stutz et al. |
| 5,802,291 | A | | 9/1998 | Balick et al. |
| 5,838,916 | A | | 11/1998 | Domenikos et al. |
| 5,864,669 | A | | 1/1999 | Osterman et al. |
| 5,872,976 | A | * | 2/1999 | Yee et al. ................. 717/127 |
| 5,881,225 | A | | 3/1999 | Worth |
| 5,884,316 | A | | 3/1999 | Bernstein et al. |
| 5,903,758 | A | * | 5/1999 | Walker ...................... 717/130 |
| 5,907,675 | A | | 5/1999 | Aahlad |
| 5,933,640 | A | * | 8/1999 | Dion .......................... 717/132 |
| 5,937,191 | A | * | 8/1999 | Graham ..................... 717/130 |
| 5,941,947 | A | | 8/1999 | Brown et al. |
| 5,958,010 | A | | 9/1999 | Agarwal et al. |
| 5,991,536 | A | * | 11/1999 | Brodsky et al. ............ 717/104 |
| 6,026,236 | A | * | 2/2000 | Fortin et al. ................. 714/38 |
| 6,026,428 | A | | 2/2000 | Hutchison et al. |
| 6,105,147 | A | | 8/2000 | Molloy |
| 6,126,329 | A | * | 10/2000 | Bennett et al. ............. 717/127 |
| 6,178,529 | B1 | * | 1/2001 | Short et al. ................... 714/51 |
| 6,263,488 | B1 | * | 7/2001 | Fortin et al. ............... 717/127 |
| 6,351,847 | B1 | * | 2/2002 | Sakamoto et al. .......... 717/127 |
| 6,393,458 | B1 | * | 5/2002 | Gigliotti et al. ............ 709/203 |
| 6,434,714 | B1 | * | 8/2002 | Lewis et al. ................. 714/38 |
| 6,622,299 | B1 | | 9/2003 | Santosuosso et al. ....... 717/127 |
| 6,658,602 | B1 | | 12/2003 | Nakano ....................... 714/38 |

OTHER PUBLICATIONS

Tripathi et al., "Design of a Remote Procedure Call System for Object–Oriented Distributed Programming," *Software—Practice and Experience,* vol. 28, No. 1, pp. 23–47, Jan. 1998.

"Remote Method Invocation Specification," http://java.sun.com/products/jdk/1.1/docs/guide/rmi/spec/rmiTOC.doc.html, pp. 1–2.

"Introduction," http://java.sun.com/products/jdk/1.1/docs/guide/rmi/spec/rmi–intro.doc.html, pp. 1–2, 1997.

"Java Distributed Object Model," http://java.sun.com/products/jdk/1.1/docs/guide/rmi/spec/rmi–objmodel.doc.html, pp. 1–7, 1997.

"System Architecture," http://java.sun.com/products/jdk/1.1/docs/guide/rmi/spec/rmi–arch.doc.html, pp. 1–12, 1997.

"Client Interfaces," http://java.sun.com/products/jdk/1.1/docs/guide/rmi/spec/rmiclient.doc.html, pp. 1–3, 1997.

"Server Interfaces," http://java.sun.com/products/jdk/1.1/docs/guide/rmi/spec/rmi–server.doc.html, pp. 1–10, 1997.

"Registry Interfaces," http://java.sun.com/products/jdk/1.1/docs/guide/rmi/spec/rmi–registry.doc.html, pp. 1–3, 1997.

"Stub/Skeleton Interfaces," http://java.sun.com/products/jdk/1.1/docs/guide/rmi/spec/rmi–stubs.doc.html, pp. 1–4, 1997.

"Garbage Collector Interfaces," http://java.sun.com/products/jdk/1.1/docs/guide/rmi/spec/rmi–dgc.doc.html, pp. 1–5, 1997.

"RMI Wire Protocol," http://java.sun.com/products/jdk/1.1/docs/guide/rmi/spec/rmi–protocol.doc.html, pp. 1–9, 1997.

"Exceptions in RMI," http://java.sun.com/products/jdk/1.1/docs/guide/rmi/spec/rmi–exceptions.doc.html, pp. 1–3, 1997.

"Properties in RMI," http://java.sun.com/products/jdk/1.1/docs/guide/rmi/spec/rmi–properties.doc.html, p. 1, 1997.

Barkley, "Role Based Access Control (RBAC)," Software Diagnostics and Conformance Testing, National Institute of Standards and Technology, pp. 1–27, Mar. 1998.

Gavrila and Barkley, "Formal Specification for Role Based Access Control User/Role and Role/Role Relationship Management," pp. 1–10, Oct. 1998.

Cugini and Ferraiolo, "Role Based Access Control Slide Set—May 1995," National Institute of Standards and Technology, pp. 1–25, May 1995.

Ferraiolo and Barkley, "Specifying and Managing Role–Based Access Control within a Corporate Intranet," pp. 1–6, 1997.

Ferraiolo and Kuhn, "Role–Based Access Control," Reprint from *Proceedings of 15th National Computer Security Conference,* pp. 1–11, 1992.

Jajodia, "Database Security and Privacy," *The Computer Science and Engineering Handbook,* Tucker (ed.), CRC Press, Inc., pp. 1112–1124, Dec. 1996.

Sandhu et al., "Authentication, Access Control, and Intrusion Detection," *The Computer Science and Engineering Handbook,* Tucker (ed.), CRC Press, Inc., pp. 1929–1948, Dec. 1996.

Orfali, Harkey, Edwards, "Client/Server Transaction Processing," *Essential Client/Server Survival Guide,* pp. 241–288, 1994.

Brockschmidt, "Custom Components and the Component Object Model," *Inside OLE, $2^{nd}$ Edition,* pp. 219–276, 1995.

Brockschmidt, "In–Place Activation (Visual Editing®) and In–Place Containers," *Inside OLE, $2^{nd}$ Edition,* pp. 1011–1063, 1995.

Limprecht, "Microsoft Transaction Server," *Compcon '97, Proceedings, IEEE,* pp. 14–18, Feb. 1997.

Eddon, "COM+: The Evolution of Component Services," *Computer,* pp. 104 and 106, Jul. 1999.

Chappell, "The Microsoft Transaction Server (MTS): Transactions Meet Components," http://www.microsoft.com/Com/wpaper/mtscomp.asp, pp. 1–17, 1997.

Orfali et al., "RPC, Messaging, and Peer–to–Peer," *Essential Client/Server Survival Guide,* pp. 119–128, 1994.

Java Remote Method Invocation—Distributed Computing for Java, http://java.sum.com/marketing/collateral/javarmi.html, pp. 1–19, Jun. 24, 1998.

Java Remote Method Invocation, http://java.sun.com/products/jdk/1.2/docs/guide/rmi/spec/rmiTOC.doc.html, pp. 1–3, Dec. 1997.

"Introduction," Java Remote Method Invocation, http://java.sun.com/products/jdk/1.2/docs/guide/rmi/spec/rmi–intro.doc.html, p. 1, Dec. 1997.

"Overview," Java Remote Method Invocation, http://java.sun.com/products/jdk/1.2/docs/guide/rmi/spec/rmi–intro.doc.1.html, p. 1, Dec. 1997.

"System Goals," Java Remote Methods Invocation, http://java.sun.com/products/jdk/1.2/docs/guide/rmi/spec/rmi–intro.doc2.html, p. 1, Dec. 1997.

"Java Distributed Object Model," Java Remote Method Invocation, http://java.sun.com/products/jdk/1.2/docs/guide/rmi/spec/rmi–objmodel.doc.html, p. 1, Dec. 1997.

"Definition of Terms," Java Remote Method Invocation, http://java.sun.com/products/jdk/1.2/docs/guide/rmi/spec/rmi–objmodel.doc1.html, p. 1, Dec. 1997.

"The Distributed and Nondistributed Models Contrasted," Java Remote Method Invocation, http://java.sun.com/products/jdk/1.2/docs/guide/rmi/spec/rmi–objmodel.doc.2.html, p. 1, Dec. 1997.

"RMI Interfaces and Classes, " Java Remote Method Invocation, http://java.sun.com/products/jdk/1.2/docs/guide/rmi/spec/rmi–objmodel.doc3.html, pp. 1–2, Dec. 1997.

"Implementing a Remote Interface," Java Remote Method Invocation, http://java.sun.com/products/jdk/1.2/docs/guide/rmi/spec/rmi–objmodel.doc.4.html, pp. 1–2, Dec. 1997.

"Type Equivalency of Remote Objects with Local Stub," Java Remote Method Invocation, http://java.sun.com/products/jdk/1.2/docs/guide/rmi/spec/rmi–objmodel.doc5.html, p. 1, Dec. 1997.

"Parameter Passing in Remote Method Invocation," Java Remote Method Invocation, http://java.sun.com/products/jdk/1.2/docs/guide/rmi/spec/rmi–objmodel.doc.6.html, p. 1, Dec. 1997.

"Exception Handling in Remote Method Invocation," Java Remote Method Invocation, http://java.sun.com/products/jdk/1.2/docs/guide/rmi/spec/rmi–objmodel.doc7.html, p. 1, Dec. 1997.

"Object Methods of Overridden by the RemoteObject Class," Java Remote Method Invocation, http://java.sun.com/products/jdk/1.2/docs/guide/rmi/spec/rmi–objmodel.doc8.html, pp. 1–2, Dec. 1997.

"The Semantics of Object Methods Declared Final," Java Remote Method Invocation, http://java.sun.com/products/jdk/1.2/docs/guide/rmi/spec/rmi–objmodel.doc.9.html, p. 1, Dec. 1997.

"Locating Remote Objects," Java Remote Method Invocation, http://java.sun.com/products/jdk/1.2/docs/guide/rmi/spec/rmi–objmodel.doc.10.html, p. 1, Dec. 1997.

"System Architecture," Java Remote Method Invocation, http://java.sun.com/products/jdk/1.2/docs/guide/rmi/spec/rmi–arch.doc.html, p. 1, Dec. 1997.

"Overview," Java Remote Method Invocation, http://java.sun.com/products/jdk/1.2/docs/guide/rmi/spec/rmi–arch.doc1.html, p. 1, Dec. 1997.

"Architectural Overview," Java Remote Method Invocation, http://java.sun.com/products/jdk/1.2/docs/guide/rmi/spec/rmi–arch.doc2.html, pp. 1–2, Dec. 1997.

"The Stub/Skeleton Layer," Java Remote Invocation, http://java.sun.com/products/jdk/1.2/docs/guide/rmi/spec/rmi–arch.doc3.html, p. 1, Dec. 1997.

"The Remote Reference Layer," Java Remote Method Invocation, http://java.sun.com/products/jdk/1.2/docs/guide/rmi/spec/rmi–arch.doc.4.html, p. 1, Dec. 1997.

"The Transport Layer," Java Remote Method Invocation, http://java.sun.com/products/jdk/1.2/docs/guide/rmi/spec//rmi–arch.doc5.html, pp. 1–2, Dec. 1997.

"Thread Usage in Remote Method Invocations," Java Remote Method Invocation, http://java.sun.com/products/jdk/1.2/docs/guide/rmi/spec/rmi–arch.doc6.html, p. 1, Dec. 1997.

"Garbage Collection of Remote Objects," Java Remote Method Invocation, http://java.sun.com/products/jdk/1.2/docs/guide/rmi/spec/rmi–arch.doc7.html, pp. 1–2, Dec. 1997.

"Dynamic Class Loading," Java Remote Method Invocation, http://java.sun.com/products/jdk/1.2/docs/guide/rmi/spec/rmi–arch.doc8.html, pp. 1–4, Dec. 1997.

"Security," Java Remote Method Invocation, http://java.sun.com/products/jdk/1.2/docs/guide/rmi/spec/rmi–arch.doc9.html, pp. 1–2, Dec. 1997.

"Configuration Scenarios," Java Remote Method Invocation, http://java.sun.com/products/jdk/1.2/docs/guide/rmi/spec/rmi–arch.doc10.html, pp. 1–2, Dec. 1997.

"RMI Through Firewalls Via Proxies," Java Remote Method Invocation, http://java.sun.com/products/jdk/1.2/docs/guide/rmi/spec/rmi–arch.doc11.html, pp. 1–3, Dec. 1997.

"Client Interfaces," Java Remote Method Invocation, http://java.sun.com/products/jdk/1.2/docs/guide/rmi/spec/rmi–client.doc.html, p. 1, Dec. 1997.

"The Remote Interface," Java Remote Method Invocation, http://java.sun.com/products/jdk/1.2/docs/guide/rmi/spec/rmi–client.doc1.html, p. 1, Dec. 1997.

"The RemoteException Class," Java Remote Method Invocation, http://java.sun.com/products/jdk/1.2/docs/guide/rmi/spec/rmi–client.doc2.html, p. 1, Dec. 1997.

"The Naming Class," Java Remote Method Invocation, http://java.sun.com/products/jdk/1.2/docs/guide/rmi/spec/rmi–client.doc3.html, pp. 1–2, Dec. 1997.

"Server Interfaces," Java Remote Method Invocation, http://java.sun.com/products/jdk/1.2/docs/guide/rmi/spec/rmi–server.doc.html, p. 1, Dec. 1997.

"The RemoteObject Class," Java Remote Method Invocation, http://java.sun.com/products/jdk/1.2/docs/guide/rmi/spec/rmi–server.doc1.html, pp. 1–2, Dec. 1997.

"The RemoteServer Class," Java Remote Method Invocation, http://java.sun.com/products/jdk/1.2/docs/guide/rmi/spec/rmi–server.doc2.html, pp. 1–2, Dec. 1997.

"The SocketType Class," Java Remote Method Invocation, http://java.sun.com/products/jdk/1.2/docs/guide/rmi/spec/rmi–server.doc3.html, pp. 1–4, Dec. 1997.

"The UnicastRemoteObject Class," Java Remote Method Invocation, http://java.sun.com/products/jdk/1.2/docs/guide/rmi/spec/rmi–server.doc4.html, pp. 1–3, Dec. 1997.

"The Unreferenced Interface," Java Remote Method Invocation, http://java.sun.com/products/jdk/1.2/docs/guide/rmi/spec/rmi–server.doc5.html, p. 1, Dec. 1997.

"The RMISecurityManager Class," Java Remote Method Invocation, http://java.sun.com/products/jdk/1.2/docs/guide/rmi/spec.rmi–server.doc6.html, pp. 1–5, Dec. 1997.

"The RMIClassLoader Class," Java Remote Method Invocation, http://java.sun.com/products/jdk/1.2/docs/guide/rmi/spec/rmi–server.doc7.html, pp. 1–2, Dec. 1997.

"The LoaderHandler Interface," Java Remote Method Invocation, http://java.sun.com/products/jdk/1.2/docs/guide/rmi/spec/rmi–server.doc8.html, p. 1, Dec. 1997.

"The RMISocketFactory Class," Java Remote Method Invocation, http://java.sun.com/products/jdk/1.2/docs/guide/rmi/spec/rmi–server.doc9.html, pp. 1–2, Dec. 1997.

"The RMIFailureHandler Interface," Java Remote Method Invocation, http://java.sun.com/products/jdk/1.2/docs/guide/rmi/spec/rmi–server.doc10.html, p. 1, Dec. 1997.

"The LogStream Class," Java Remote Method Invocation, http://www.java.sun.com/products/jdk/1.2/docs/guide/rmi/spec/rmi–server.doc11.html, pp. 1–2, Dec. 1997.

"Stub and Skeleton Compiler," Java Remote Method Invocation, http://java.sun.com/products/jdk/1.2/docs/guide/rmi/spec/rmi–server.doc12.html, p. 1, Dec. 1997.

"Registry Interfaces," Java Remote Method Invocation, http://java.sun.com/products/jdk/1.2/docs/guide/rmi/spec/rmi–registry.doc.html, p. 1, Dec. 1997.

"The Registry Interface," Java Remote Method Invocation, http://java.sun.com/products/jdk/1.2/docs/guide/rmi/spec/rmi–registry.doc1.html, pp. 1–2, Dec. 1997.

"The LocateRegistry Class," Java Remote Method Invocation, http://java.sun.com/products/jdk/1.2/docs/guide/rmi/spec/rmi–registry.doc2.html, pp. 1–2, Dec. 1997.

"The RegistryHandler Interface," Java Remote Method Invocation, http://java.sun.com/products/jdk/1.2/docs/guide/rmi/spec/rmi–registry.doc3.html, p. 1, Dec. 1997.

"Remote Object Activation," Java Remote Method Invocation, http://java.sun.com/products/jdk/1.2/docs/guide/rmi/spec/rmi–activation.doc.html, p. 1, Dec. 1997.

"Overview," Java Remote Method Invocation, http://java.sun.com/products/jdk/1.2/docs/guide/rmi/spec/rmi–activation.doc1.html, pp. 1–2, Dec. 1997.

"Activation Protocol," Java Remote Method Invocation, http://java.sun.com/products/jdk/1.2/docs/guide/rmi/spec/rmi–activation.doc2.html, pp. 1–2, Dec. 1997.

"Implementation Model for an "Activatable" Remote Object," Java Remote Method Invocation, http://java.sun.com/products/jdk/1.2/docs/guide/rmi/spec/rmi–activation.doc.3.html, pp. 1–12, Dec. 1997.

"Activation Interfaces," Java Remote Method Invocation, http://java.sun.com/products/jdk/1.2/docs/guide/rmi/spec/rmi–activation.doc4.html, pp. 1–14, Dec. 1997.

"Stub/Skeleton Interfaces," Java Remote Method Invocation, http://java.sun.com/products/jdk/1.2/docs/guide/rmi/spec/rmi–stubs.doc.html, p. 1, Dec. 1997.

"The RemoteStub Class," Java Remote Method Invocation, http://java.sun.com/products/jdk/1.2/docs/guide/rmi/spec/rmi–stubs.doc1.html, p. 1, Dec. 1997.

"The RemoteCall Interfaces," Java Remote Method Invocation, http://www.java.sun.com/products.jdk/1.2/docs/guide/rmi/spec/rmi–stubs.doc2.html, pp. 1–2, Dec. 1997.

"The RemoteRef Interface," Java Remote Method Invocation, http://java.sun.com/products/jdk/1.2/docs/guide/rmi/spec/rmi–stubs.doc3.html, pp. 1–2, Dec. 1997.

"The ServerRef Interface," Java Remote Method Invocation, http://java.sun.com/products/jdk/1.2/docs/guide/rmi/spec/rmi–stubs.doc4.html, p. 1, Dec. 1997.

"The Skeleton Interface," Java Remote Method Invocation, http://java.sun.com/products/jdk/1.2/docs/guide/rmi/spec/rmi–stubs.doc5.html, p. 1, Dec. 1997.

"The Operation Class," Java Remote Method Invocation, http://java.sun.com/products/jdk//1.2/docs/guide/rmi/spec/rmi–stubs.doc6.html, p. 1, Dec. 1997.

"Garbage Collector Interfaces," Java Remote Method Innovation, http://java.sun.com/products/jdk/1.2/docs/guide/rmi/spec/rmi–dgc.doc.html, p. 1, Dec. 1997.

"The Interface DGC," *Java Remote Method Invocation*, http://java.sun.com/products/jdk/1.2/docs/guide/rmi/spec/rmi–dgc.doc1.html, pp. 1–2, Dec. 1997.

"The Lease Class," Java Remote Method Invocation, http://java.sun.com/products/jdk/1.2/docs/guide/rmi/spec/rmi–dgc.doc2.html, p. 1, Dec. 1997.

"The ObjID Class," Java Remote Method Invocation, http://www.java.sun/com/products/jdk/1.2/docs/guide/rmi/spec/rmi–dgc.doc3.html, pp. 1–2, Dec. 1997.

"The UID Class," Java Remote Method Invocation, http://java.sun.com/products/jdk/1.2/docs/guide/rmi/spec/rmi–dge.doc4.html, pp. 1–2, Dec. 1997.

"The VMID Class," Java Remote Method Invocation, http://java.sun.com/products/jdk/1.2/docs/guide/rmi/spec/rmi–dgc.doc5.html, pp. 1–2, Dec. 1997.

"RMI Wire Protocol," Java Remote Method Invocation, http://java.sun.com/products/jdk/1.2/docs/guide/rmi/spec/rmi–protocol.doc.html, p. 1, Dec. 1997.

"Overview," Java Remote Method Invocation, http://java-.sun.com/products/jdk/1.2/docs/guide/rmi/spec/rmi–protocol.doc1.html, p. 1, Dec. 1997.

"RMI Transport Protocol," Java Remote Method Invocation, http://java.sun.com/products/jdk/1.2/docs/guide/rmi/spec/rmi–protocol.doc2.html, pp. 1–3, Dec. 1997.

"RMI's Use of Object Serialization Protocol," Java Remote Method Invocation, http://java.sun.com/products/jdk/1.2/docs/guide/rmi/spec/rmi–protocol.doc3.html, pp. 1–2, Dec. 1997.

"RMI's Use of HTTP POST Protocol," Java Remote Method Invocation, http://java.sun.com/products/jdk/1.2/docs/guide/rmi/spec/rmi–protocol.doc4.html, p. 1, Dec. 1997.

"Application Specific Values for RMI," Java Remote Method Invocation, http://java.sun.com/products/jdk/1.2/docs/guide/rmi/spec/rmi–protocol.doc5.html, p. 1, Dec. 1997.

"RMI's Multiplexing Protocol," Java Remote Methods Invocation, http://java.sun.com/products/jdk/1.2/docs/guide/rmi/spec/rmi–protocol.doc6.html, pp. 1–6, Dec. 1997.

"Exceptions During Remote Object Export," Java Remote Method Invocation, http://java.sun.com/products/jdk/1.2/docs/guide/rmi/spec/rmi–exceptions.doc1.html, pp. 1–2, Dec. 1997.

"Exceptions During RMI Call," Java Remote Method Invocation, http://java.sun.com/products/jdk/1.2/docs/guide/rmi/spec/rmi–exceptions.doc2.html, p. 1, Dec. 1997.

"Possible Causes of java.rmi.ServerException," Java Remote Method Invocation, http://java.sun.com/products/jdk/1.2/docs/guide/rmi/spec/rmi–exceptions.doc4.html, p. 1, Dec. 1997.

"Naming Exceptions," Java Remote Method Invocation, http://java.sun.com/products/jdk/1.2/docs/guide/rmi/spec/rmi–exceptions.doc5.html, p. 1, Dec. 1997.

"Other Exceptions," Java Remote Method Invocation, http://java.sun.com/products/jdk/1.2/docs/guide/rmi/spec/rmi–exceptions.doc6.html, p. 1, Dec. 1997.

"Properties in RMI," Java Remote Method Invocation, http://java.sun.com/products/jdk/1.2/docs/guide/rmi/spec/rmi–properties.doc.html, p. 1, Dec. 1997.

"Server Properties," Java Remote Method Invocation, http://java.sun.com/products/jdk/1.2/docs/guide/rmi/spec/rmi–properties.doc1.html, p. 1, Dec. 1997.

"Activation Properties," Java Remote Method Invocation, http://java.sun.com/products/jdk/1.2/docs/guide/rmi/spec/rmi–properties.doc2.html, p. 1, Dec. 1997.

"Other Properties," Java Remote Method Invocation, http://java.sun.com/products/jdk/1.2/docs/guide/rmi/spec/rmi–properties.doc3.html, p. 1, Dec. 1997.

Kiczales, Aspect–Oriented–Programming, http://www-.parc.xerox.com/spl/projects/aop/invited–talk, 86 pp. 1997.

Aksit et al., "Solving the Modeling Problems of Object–Oriented Languages by Composing Multiple Aspects Using Composition Filters," *Proceedings of the Aspect–Oriented Programming Workshop at ECOOP '98,* 7 pp., 1998.

Bardou, "Roles, Subjects and Aspects: How Do They Relate?," *Proceedings of the Aspect–Oriented Programming Workshop at ECOOP '98,* 7 pp., 1998.

Becker, "$D^2$–AL," *Proceedings of the Aspect–Oriented Programming Workshop at ECOOP '98,* 7 pp., 1998.

Berger et al., "Interactions Between Objects: An Aspect of Object–Oriented Languages," *Proceedings of the Aspect–Oriented Programming Workshop at ECOOP '98,* 6 pp., 1998.

Blair et al., "The Impact of Aspect–Oriented Programming on Formal Methods," *Proceedings of the Aspect–Oriented Programming Workshop at ECOOP '98,* 6 pp., 1998.

Blank et al., "Aspects of Enterprise Java Beans," *Proceedings of the Aspect–Oriented Programming Workshop at ECOOP '98,* 4 pp., 1998.

Böllert, "Aspect–Oriented Programming Case Study: System Management Application," *Proceedings of the Aspect–Oriented Programming Workshop at ECOOP '98,* 4 pp., 1998.

Buhr, "A Possible Design Notation for Aspect Oriented Programming," *Proceedings of the Aspect–Oriented Programming Workshop at ECOOP '98,* 11 pp., 1998.

Fabry, "Replication as an Aspect," *Proceedings of the Aspect–Oriented Programming Workshop at ECOOP '98,* 6 pp., 1998.

Fradet et al., "AOP: Towards A Genetic Framework Using Program Transformation and Analysis," *Proceedings of the Aspect–Oriented Programming Workshop at ECOOP '98,* 6 pp., 1998.

Hauck et al., "AspectIX: A Middleware for Aspect–Oriented Programming," *Proceedings of the Aspect–Oriented Programming Workshop at ECOOP '98,* 5 pp., 1998.

Holmes et al., "Towards Reusable Synchronisation for Object–Oriented Languages," *Proceedings of the Aspect–Oriented Programming Workshop at ECOOP '98,* 10 pp., 1998.

Kendall, "Agent Roles and Aspects," *Proceedings of the Aspect–Oriented Programming Workshop at ECOOP '98,* 7 pp., 1998.

Lopes et al., "Recent Developments in AspectJ®," *Proceedings of the Aspect–Oriented Programming Workshop at ECOOP '98,* 4 pp., 1998.

Lorenz et al., "Visitor Beans: An Aspect–Oriented Pattern," *Proceedings of the Aspect–Oriented Programming Workshop at ECOOP '98,* 8 pp., 1998.

Lunau, "Is Composition of Metaobjects=Aspect Oriented Programming," *Proceedings of the Aspect–Oriented Programming Workshop at ECOOP '98,* 4 pp., 1998.

Kenens et al., "An AOP Case with Static and Dynamic Aspects," *Proceedings of the Aspect–Oriented Programming Workshop at ECOOP '98,* 6 pp., 1998.

Nebbe, "Coordination and Composition: The Two Paradigms Underlying AOP?," *Proceedings of the Aspect–Oriented Programming Workshop at ECOOP '98,* 5 pp., 1998.

Ossher et al., "Operation–Level Composition: A Case in (Join) Point," *Proceedings of the Aspect–Oriented Programming Workshop at ECOOP '98,* 4 pp., 1998.

Sánchez et al., "Run–Time Adaptability of Synchronization Policies in Concurrent Object–Oriented Languages," *Proceedings of the Aspect–Oriented Programming Workshop at ECOOP '98,* 10 pp., 1998.

Tekinerdogan et al., "Deriving Design Aspects from Canonical Models," *Proceedings of the Aspect–Oriented Programming Workshop at ECOOP '98,* 7 pp., 1998.

Walker et al., "Assessing Aspect–Oriented Propgramming and Design: Preliminary Results," *Proceedings of the Aspect–Oriented Programming Workshop at ECOOP '98,* 6 pp., 1998.

Volder, "Aspect–Oriented Logic Meta Programming," *Proceedings of the Aspect–Oriented Programming Workshop at ECOOP '98,* 6 pp., 1998.

Mens et al., "Aspect–Oriented Programming Workshop Report," *Proceedings of the Aspect–Oriented Programming Workshop at ECOOP '97,* 14 pp., 1997.

Aksit, "Issues in Aspect–Oriented Software Development," *Proceedings of the Aspect–Oriented Programming Workshop at ECOOP '97,* 7 pp., 1997.

Czarnecki et al., "Beyond Objects: Generative Programming," *Proceedings of the Aspect–Oriented Programming Workshop at ECOOP '97,* 8 pp., 1997.

De Meuter, "Monard as a Theoretical Foundation for AOP," *Proceedings of the Aspect–Oriented Programming Workshop at ECOOP '97,* 6 pp., 1997.

Dempsey et al., "Aspects of System Support for Distributed Computing," *Proceedings of the Aspect–Oriented Programming Workshop at ECOOP '97,* 6 pp., 1997.

Hernández et al., "Coordinating Concurrent Objects: How to Deal with the Coordination Aspect?," *Proceedings of the Aspect–Oriented Programming Workshop at ECOOP '97,* 6 pp., 1997.

Holmes et al., "Aspects of Synchronisation," *Proceedings of the Aspect–Oriented Programming Workshop at ECOOP '97,* 6 pp., 1997.

Lamping, "The Interaction of Components and Aspects," *Proceedings of the Aspect–Oriented Programming Workshop at ECOOP '97,* 1 pp., 1997.

Matthijs et al., "Aspects Should Not Die," *Proceedings of the Aspect–Oriented Programming Workshop at ECOOP '97,* 5 pp., 1997.

Müller, "draft: Aspect–Design in the Building–Block Method," *Proceedings of the Aspect–Oriented Programming Workshop at ECOOP '97,* 3 pp., 1997.

Harrison et al., "The Beginnings of a Graphical Environment for Subject–Oriented Programming," *Proceedings of the Aspect–Oriented Programming Workshop at ECOOP '97,* 2 pp., 1997.

Thorup, "Contextual Class Extensions," *Proceedings of the Aspect–Oriented Programming Workshop at ECOOP '97,* 7 pp., 1997.

VanHilst, "Subcomponent Decomposition as a Form of Aspect Oriented Programming," *Proceedings of the Aspect–Oriented Programming Workshop at ECOOP '97,* 2 pp., 1997.

Van Roy et al., "Using Mobility to Make Transparent Distribution Practical," *Proceedings of the Aspect–Oriented Programming Workshop at ECOOP '97,* 18 p., 1997.

Werner, "Email Thoughts," *Proceedings of the Aspect–Oriented Programming Workshop at ECOOP '97,* 1 pp., 1997.

Brockschmidt, "Local/Remote Transparency," *Inside OLE*, $2^{nd}$ Edition, pp. 277–338, 1995.

Lam, "Building Scalable Apps," *PC Magazine*, pp. 209–210, 212–214, Apr. 21, 1998.

"White Paper, DCOM Technical Overview," Microsoft Corporation, pp. 1–43, Apr. 1998.

Orfali et al., "COM: OLE's Object Bus," *The Essential Distributed Objects Survival Guide*, pp., 429–452, 1996.

Orfali et al., "CORBA Services: System Management and Security," *Essential Client/Server Survival Guide*, pp. 183–202, 1994.

Horstmann et al., *DCOM Architecture*, pp. 1–55, Jul. 23, 1997.

Matena et al., Enterprise JavaBeans™, Version 1.0, Sun Microsystems, pp. 1–95, 97–145, and 147–181, Mar. 21, 1998.

"The Component Object Model: Technical Overview," Microsoft Component Object Model (COM): A Technical Overview of COM, http://www.microsoft.com/com/wpaper/Com_modl.html, pp. 1–17, 1996.

Vinoski, "New Features for CORBA 3.0," *Communications of the ACM*, vol. 41, No. 10, pp. 44–52, Oct. 1998.

Schmidt, "Evaluating Architectures For Multithreaded Object Request Brokers," *Communications Of The ACM*, vol. 41, No. 10, pp. 54–60, Oct. 1998.

Henning, "Binding, Migration, and Scalability in CORBA," *Communication of the ACM*, vol. 41, No. 19, pp. 62–71, Oct. 1998.

Haggerty, "The Benefits of CORBA–Based Network Management," *Communications of the ACM*, vol. 41, No. 10, pp. 73–79, Oct. 1998.

Grimes, "Security," *Professional DCOM Programming*, Wrox Press Ltd., pp. 319–387, 1997.

Sessions, "Sharing and Scalability," *COM and DCOM*, pp. 249–313, 1998.

Sessions, "Clustering," *COM and DCOM*, pp. 413–442, 1998.

Schroeder et al., *Performance of Firefly RPC*, Digital Equipment Corporation, pp. 1–15, 1989.

Thacker et al., *Firefly: A Multiprocessor Workstation*, Digital Equipment Corporation, pp. 1–13, 15, and 17–18, 1987.

"CORBA Overview," *The Common Object Request Broker: Architecture and Specification*, Revision 2.0, pp. 2–1 through 2–17, Jul. 1995.

*The Common Object Request Broker: Architecture and Specification*, Revision 2.0, pp. 4–12 through 4–16, Jul. 1995.

"Balance on the Back End," *InfoWorld*, pp. 72–75, 78, 80, 82–83, and 86, Mar. 23, 1998.

Nance, "Balance the Load with Transaction Server," http://www.byte.com/art/9706/sec6/art1.htm, pp. 1–8, Jun. 1997.

Landwehr, *The Computer Science and Engineering Handbook*, Tucker (ed.), CRC Press, Inc., pp. 1914–1928, Dec. 1996.

Schiemann et al., "A New Approach for Load Balancing in High–Performance Decision Support Systems," *Future Generation Computer Systems*, vol. 12, pp. 345–355, 1997.

Brockschmidt, "An Overview of OLE," *Inside OLE*, $2^{nd}$ Edition, pp. 3–60, 1995.

Brockschmidt, $2^{nd}$ Edition, pp. 248–251, 1995.

Hunt et al., "Coign: Efficient Instrumentation for Inter-–Component Communication Analysis," URCS Tech Report 648, University of Rochester, Rochester, NY, 11 pp. (Feb. 1997).

Davis, "Inside IBM's System View," *Datamation*, vol. 37 n4: 62–63, 1991.

Bowen, "Intel's Middleware Move," *InfoWorld*, vol. 20, Issue 9: 1–2, 1998.

Teegan, *Network Operations and Management Symposium, IEEE*, "Distributed Performance Monitoring Using SNMP V2," 1996.

Baker, "Network Management in the Enterprise," *Performance Computing*, vol. 17, No. 6: 23–34, 1999.

Spuler, *Enterprise Application Management with PATROL*, $1^{st}$ Edition, Prentice Hall, PTR, 1999.

Bochenski, *IBM's SystemView*, $1^{st}$ Edition, Computer Technology Research Corporation, 1991.

"Using Secure RPC," MSDN Library CD, pp. 1–7, Apr. 1998.

Brown et al., "Distributed Component Object Model Protocol—DCOM/1.0," http://globecom.net/ietf/draft/draft–brown–dcom–v1–spec–03.html, pp. 1–52, Jan. 1998.

Jonathan D. Moffett. Specification of Management Policies and Discretionary Access Control. In M.S. Sloman, editor, Network and Distributed Systems Management, chapter 18, pp. 18–1 through 18–21. Addison–Wesley, 1994.

Sloman, M., and J. Moffett. "Managing Distributed Systems", Domino Project Report, Imperial College, U.K. Sep. 1989 (pp. 1–23).

G. Wiederhold: Mediators in the Architecture of Future Information Systems. IEEE Computer, 25(3), 1992 (36 pages).

M. S. Sloman, Policy Driven Management for Distributed Systems. Journal of Network and Systems Management, 2(4): 333–360, Plenum Press Publishing, 1994 (22 pages in downloaded format).

Jonathan D. Moffett, Morris S. Sloman. Policy Hierarchies for Distributed Systems Management. IEEE Journal on Selected Areas in Communications, Special Issue on Network Management, 11(9):1404–1414, Dec. 1993 (22 pages in downloaded format).

Scott A. Gile. Reporting Application Usage in a LAN Environment, New Centerings in Computing Services, pp. 147–159 (1990).

Moffett J.D. & Sloman M.S. (1991b), The Representation of Policies as System Objects, Proceedings of the Conference on Organisational Computer Systems (COC'91) Atlanta, GA, Nov. 5–8, 1991, in SIGOIS Bulletin vol. 12, Nos. 2 & 3, pp. 171–184 (16 pages in downloaded format).

\* cited by examiner

OBJECT-BASED SOFTWARE MANAGEMENT

TECHNICAL FIELD

The invention relates to managing object-based software, and more particularly relates to generating operational management information transparently to monitored software objects.

BACKGROUND OF THE INVENTION

A variety of systems have evolved for accommodating software objects in a variety of information processing scenarios. For example, a server application running software objects on a host or server computer in a distributed network can provide services or functions for client applications running on terminal or workstation computers of the network which are operated by a multitude of users. Common examples of such server applications include software for processing class registrations at a university, travel reservations, money transfers at a bank, and sales at a retail business. In these examples, the processing services provided by the server application may update databases of class schedules, hotel reservations, account balances, product shipments, payments, or inventory for actions initiated by the individual users at their respective stations. A common way to implement these applications is by exchanging data through a web site hosted on the server.

As organizations become more dependent on their information systems, successful business operation is increasingly tied to application software availability. Thus, certain applications need to be available at all times; any interruption in service results in lost customers or missed deadlines. Applications playing an integral part in business operations are sometimes called "mission critical" or "24×7" applications. For example, if an order center is open twenty-four hours a day to accept customer information requests and orders, inferior performance or failure at any time impairs business operation. To avoid service interruption, an organization assigns the task of monitoring application performance and availability to a team of information technology professionals known as system administrators.

The system administrators strive to ensure the server applications provide consistent, quality service. However, maintaining service is an ongoing battle against a variety of factors. Inevitably, an application becomes overloaded with requests for service, or software anomalies crash the application altogether, leading to inferior or interrupted performance and loss of mission critical functions. If the system administrators wait for customer complaints before taking action, some users have already experienced poor service. Also, if the system administrators wait until a server fails completely (or "crashes"), they must expend considerable time and effort to restore service. And, as the number of applications and servers grows into an enterprise-wide system, inferior performance may go unnoticed. Finally, the system administrators typically find themselves chasing down urgent failures rather than focusing on improving application performance. Ideally, then, system administrators should monitor application performance to avoid problems instead of reacting to user complaints.

To achieve this end, system administrators turn to management software, to provide an indication of how each system is performing and whether the system has failed. In this way, the system administrators avoid service outages and can see a particular system needs attention because performance is degrading.

Two techniques for gathering information about a system's operation (sometimes called "operational management information") have developed for management software: non-intrusive and intrusive. Non-intrusive techniques require little or no modification to existing applications but provide limited information. For example, non-instrusive management software may monitor free disk space or sniff network packets. Additional features include an alert system; the system administrator can specify criteria (e.g., disk free space falls to under 1 percent) that will trigger an alert (e.g., page the administrator). However, non-intrusive techniques are of limited use because they typically monitor the underlying system rather than a particular application. Thus, a non-intrusive technique typically cannot pinpoint what application functionality is causing trouble. For example, in the above example, the alert does not explain why the disk usage has increased or which application is responsible for the increase.

Intrusive techniques offer additional information not provided by non-intrusive techniques. In one intrusive technique, a process called instrumentation is applied to each application. To instrument an application, programming instructions are added throughout the application to send information to management software. The instructions may relay information indicating a location within the application, allowing the management software to determine what portions of the application are responsible for generating error conditions or triggering alarms.

For example, code could be placed in a customer order application to send a notification to the management software when a customer order is received and another notification when processing for the order is completed. In this way, the management software can provide information about the number of orders received and the number of orders completed per minute. If the number of orders completed per minute drops to zero while the number of orders received per minute remains constant, it is likely that some portion of the system has failed; further it appears the problem is with processing orders, not receiving them. Thus, an alarm set to inform the administrator when the orders completed rate drops below 20% of the orders received rate indicates both that there is a problem and that the administrator should investigate why orders are not being completed.

However, intrusive management techniques suffer from various problems. First, the instrumentation process requires an application developer to undergo the process of including extra code at development time or retrofitting a current application with instrumentation code. And, during the instrumentation process, the developer must determine how much instrumentation is sufficient. There are numerous degrees of instrumentation, and it is not always clear at application development time how much instrumentation is desired. Excess instrumentation can degrade performance, but too little might not provide sufficient information to adequately manage the application. If the wrong decisions are made, the application must be modified yet again.

Thus, instrumentation requires exercise of seasoned judgment and care on the part of the application developer, who may consult with the system administrators to incorporate their experience into the instrumentation process. As a result, instrumentation requires expertise in high demand, and the process drains resources from the primary tasks of developing, improving, and maintaining the application. In addition, since instrumentation itself can introduce new problems, the instrumented version of the software must be tested to detect newly introduced software bugs.

Second, instrumentation can be implemented according to one of a variety of instrumentation standards, and an application instrumented according to one standard may not work with management software expecting a different instrumentation standard. Thus, if two departments using different standards are combined, two different application management systems must be run in parallel unless the software is re-instrumented.

Thus, system administrators are forced to choose between a non-intrusive monitoring technique which provides no information at the application level and instrumentation, which requires an experienced software developer who modifies an application to accommodate specific management software.

SUMMARY OF THE INVENTION

The invention includes a method and system for managing a set of objects, such as those forming an application or other program. In an architecture accommodating software objects, operations on software objects are monitored to generate information for a software management software system. The result is automatic instrumentation performed at run time.

Thus, a software developer can write software without knowledge of software management technology. Subsequently, when objects are created at run time, wrappers associated with the objects generate notifications representing operational management information. Further, plural notifications can be transformed into further operational management information for incorporation into an enterprise software management system. Thus, the logic for sending notifications is contained outside the software objects, and software developers can avoid instrumenting their software. As a result, a developer can focus energy on other tasks related to software development, such as business logic. Thus, software management technology is brought to organizations without access to software management expertise and experience.

The operational management information can include information for grouping the information, such as for grouping information related to software residing on plural computers. Thus, a system administrator or an automated software manager can monitor a program's performance, even if the program is composed of objects scattered over several computers. The system supports a comfort screen to provide assurance that software is operating normally and can generate an alert when operational management information meets certain criteria. The system can automatically act on alerts by, for example, paging an administrator when a particular value falls outside an acceptable threshold.

In one aspect of the invention, the management software provides object-related notifications based on external interactions with the objects. For example, a notification is sent when a client program invokes a software object's method. In this way, execution of the software can be traced and stored in a log. Such a log is useful, for example, in determining the source of software failure.

In another aspect of the invention, notifications are published as events in a loosely coupled publish and subscribe arrangement. In this way, management software can subscribe to the events, log them, and transform them into additional operational management metrics such as operational management metrics indicating a particular program's performance. The events are grouped into categories to facilitate selection of events of interest, and the architecture supports user-defined events. To improve performance and avoid creating numerous publishers, plural notifications can be collected by a single publisher in a system process. A subscriber can specify which notifications it wishes to receive, allowing an automated software manager to automatically (e.g., via an alert) subscribe to additional events related to a problem when the problem is detected.

Since the publisher and subscriber are loosely coupled, the architecture easily accommodates a custom software manager. Also, a program can monitor itself by subscribing to the events and monitoring them.

In yet another aspect of the invention, notifications are generated by system services for incorporation into the object-related notifications. In this way, a more complete picture of a program's performance is assembled, including information on transactions and resource allocation.

In still another aspect of the invention, events can be collected from a software manager of a lower hierarchical position and relayed to an enterprise software manager of a higher hierarchical position. In this way, software performance can be evaluated at various levels throughout the enterprise. If a problem is detected at a high level, lower levels can be examined to zoom to problem details.

Yet another aspect of the invention involves tracing software operation by activity. In this way, the system provides a trace of the string of actions performed for a particular user interaction with the software and aids in tuning system performance based on activity volume and resources consumed by the activities.

Additional features and advantages of the invention will be made apparent from the following detailed description of illustrated embodiments, which proceeds with reference to the accompanying drawings.

DETAILED DESCRIPTION OF THE INVENTION

The invention is directed toward a method and system for providing an object execution environment with a software management framework providing automatic collection of operational management information for programs. In one embodiment illustrated herein, the invention is incorporated into an object services component entitled "COM+" of an operating system entitled "MICROSOFT WINDOWS 2000," both marketed by Microsoft Corporation of Redmond, Washington. Briefly described, this software is a scaleable, high-performance network and computer operating system providing an object execution environment for object programs conforming to COM. COM+ also supports distributed client/server computing. The COM+ component incorporates new technology as well as object services from prior object systems, including the MICROSOFT Component Object Model (COM), the MICROSOFT Distributed Component Object Model (DCOM), and the MICROSOFT Transaction Server (MTS).

Exemplary Operating Environment

Figure 1:
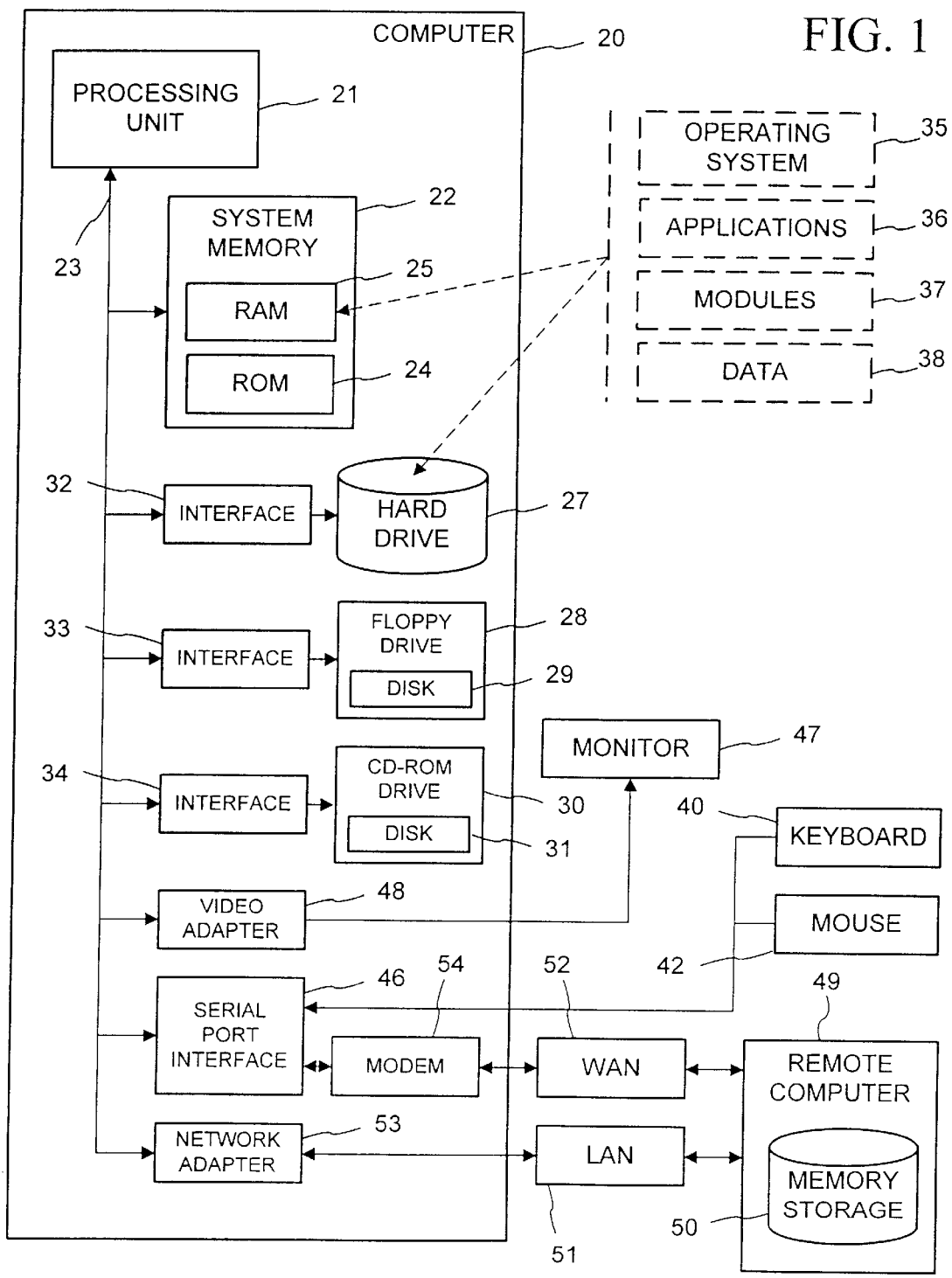
FIG. 1 is a block diagram of a computer system that may be used to implement the described software management framework for object-based software.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize the invention also may be implemented in combination with other programs. Generally, programs include routines, software objects (also called components), data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of programs may be stored in the drives and RAM 25, including an operating system 35, one or more application programs 36, other programs 37, and program data 38. The operating system 35 in the illustrated computer may be the MICROSOFT WINDOWS NT Server operating system, together with the before mentioned MICROSOFT Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a terminal computer, another server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, extranets, and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Object Overview

Figure 2:
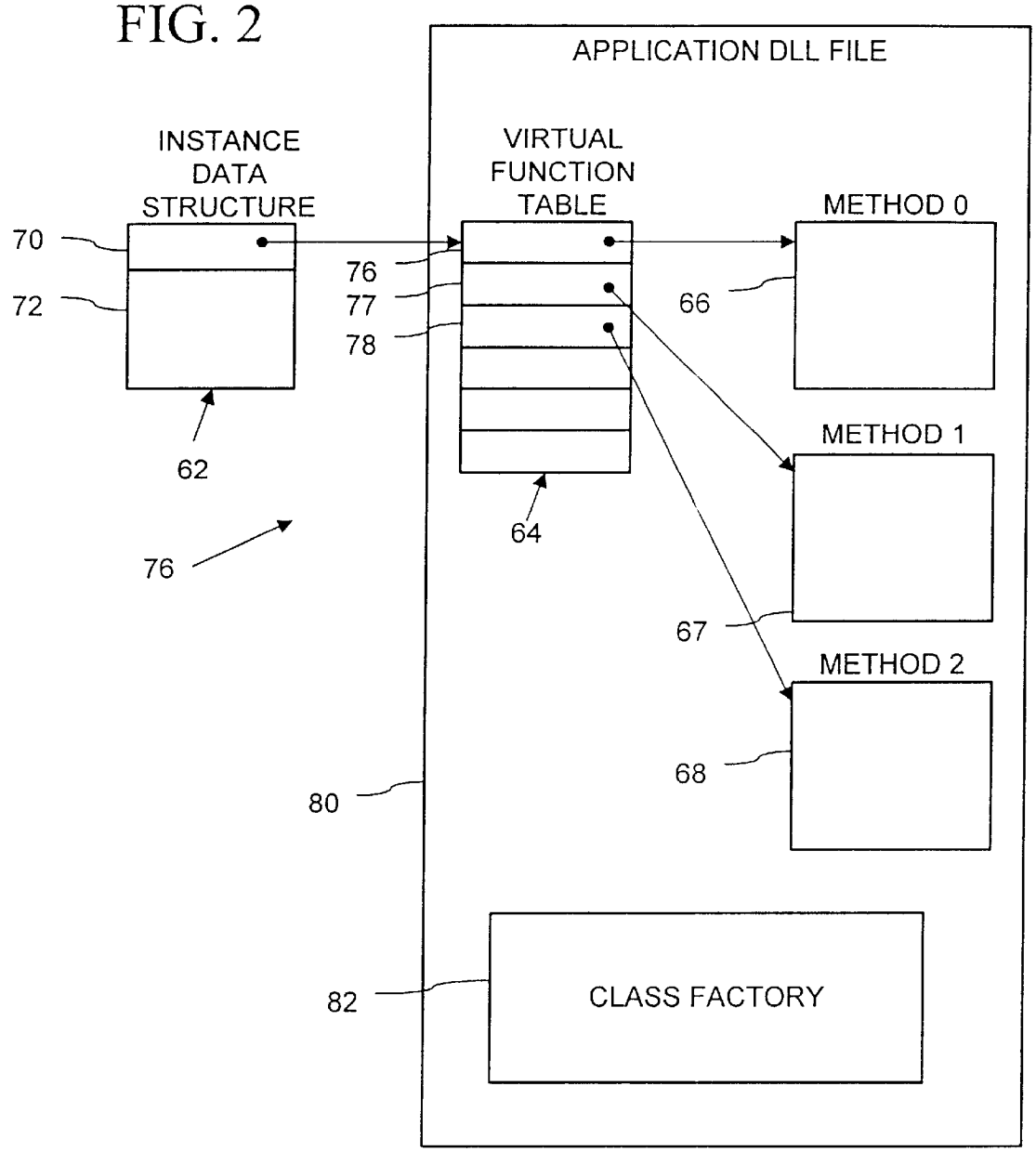
FIG. 2 is a block diagram of an object conforming to the Component Object Model specification of Microsoft Corporation, which may be used to construct objects for developing an object-based program managed by the described software management framework.

FIG. 2 and the following discussion are intended to provide an overview of software objects, using the MICROSOFT Component Object Model (COM) as an exemplary object model. In the illustrated embodiments, a software management framework is implemented in an extension to the MICROSOFT COM Environment termed "COM+." COM is a model for accommodating software objects and can be implemented on a variety of platforms, such as the MICROSOFT WINDOWS NT operating system. In the illustrated embodiments of the invention, the software objects conform to the MICROSOFT Component Object Model ("COM") specification (i.e., are implemented as a "COM Object" 76) and are executed using the COM+ services of the MICROSOFT WINDOWS 2000 operating system, but alternatively may be implemented according to other object standards (including the CORBA (Common Object Request Broker Architecture) specification of the Object Management Group and JavaBeans by Sun Microsystems) and executed under object services of another operating system. The COM specification defines binary standards for objects and their interfaces which facilitate the integration of software objects into programs. (For a detailed discussion of COM and OLE, see Kraig Brockschmidt, *Inside OLE, Second Edition*, Microsoft Press, Redmond, Wash. (1995)).

In accordance with COM, the COM object 76 is represented in the computer system 20 (FIG. 1) by an instance data structure 62, a virtual function table 64, and member methods (also called member functions) 66–68. The data structure 62 contains a pointer 70 to the virtual function table 64 and data 72 (also referred to as data members, or properties of the object). A pointer is a data value that holds the address of an item. The virtual function table 64 contains entries 76–78 for the member methods 66–68. Each of the entries 76–78 contains a references to the code 66–68 that implements the corresponding member methods.

The pointer 70, the virtual function table 64, and the member methods 66–68 implement an interface of the COM object 76. By convention, the interfaces of a COM object are illustrated graphically as a plug-in jack as shown for the software objects 312 and 334 in FIG. 5. Also, interfaces conventionally are given names beginning with a capital "I." In accordance with COM, the COM object 76 can include multiple interfaces, which are implemented with one or more virtual function tables. The member function of an interface is denoted as "IInterfaceName::MethodName."

The virtual function table 64 and member methods 66–68 of the COM object 76 are provided by an object server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member methods 66–68 of the classes that it supports, and also includes a class factory 82 that generates, the instance data structure 62 for an object of the class.

Other objects and programs (referred to as a "client" of the COM object 76) access the functionality of the COM object by invoking the member methods through the COM object's interfaces. Typically however, the COM object is first instantiated (i.e., by causing the class factory to create the instance data structure 62 of the object); and the client obtains an interface pointer to the COM object.

Before the COM object 76 can be instantiated, the object is first installed on the computer 20. Typically, installation involves installing a group of related objects called a package. The COM object 76 is installed by storing the object server DLL file(s) 80 that provides the object in data storage accessible by the computer 20 (typically the hard drive 27, shown in FIG. 1), and registering COM attributes (e.g., class identifier, path and name of the object server DLL file 80, etc.) of the COM object in one or more data stores storing configuration information. Configuration data stores for the object include the registry and the catalog.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the MICROSOFT WINDOWS 2000 operating system in a file named "OLE32.DLL." Other versions of COM+ or other object services may use another file or another mechanism. Also in COM+, classes of COM objects are uniquely associated with class identifiers ("CLSIDs"), and registered by their CLSID in the registry (or the catalog, or both). The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateG-UID" (or any of several other APIs and utilities that are used to create universally unique identifiers) and assigns to the respective classes. The interfaces of a component additionally are associated with interface identifiers ("IIDs").

In particular, the COM+ library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class' executable file, and uses the class factory in the executable file to create an instance of the COM object 76. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 76 in the system registry.

Once the client of the COM object 76 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a member function named "QueryInterface( )." The "QueryInterface( )" function can be called with an interface-identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 76 can be used to call the QueryInterface function.

Illustrated Embodiments

In the following illustrated embodiments, a framework for accommodating objects collects operational management information transparently to programs being monitored. The framework thus transparently provides various operational management metrics to facilitate software management. The arrangement frees software developers from including logic for generating operational management information, allowing software developers to focus on developing other aspects (e.g., the business logic) of their programs.

Overview of an Implementation of Enterprise Software Management for Object-based Software In the illustrated implementations, an architecture for facilitating enterprise software management is used to collect operational management metrics by transparently monitoring interactions with software objects. Monitoring can be accomplished using an object operation monitor such as an interceptor or a wrapper.

Figure 3:
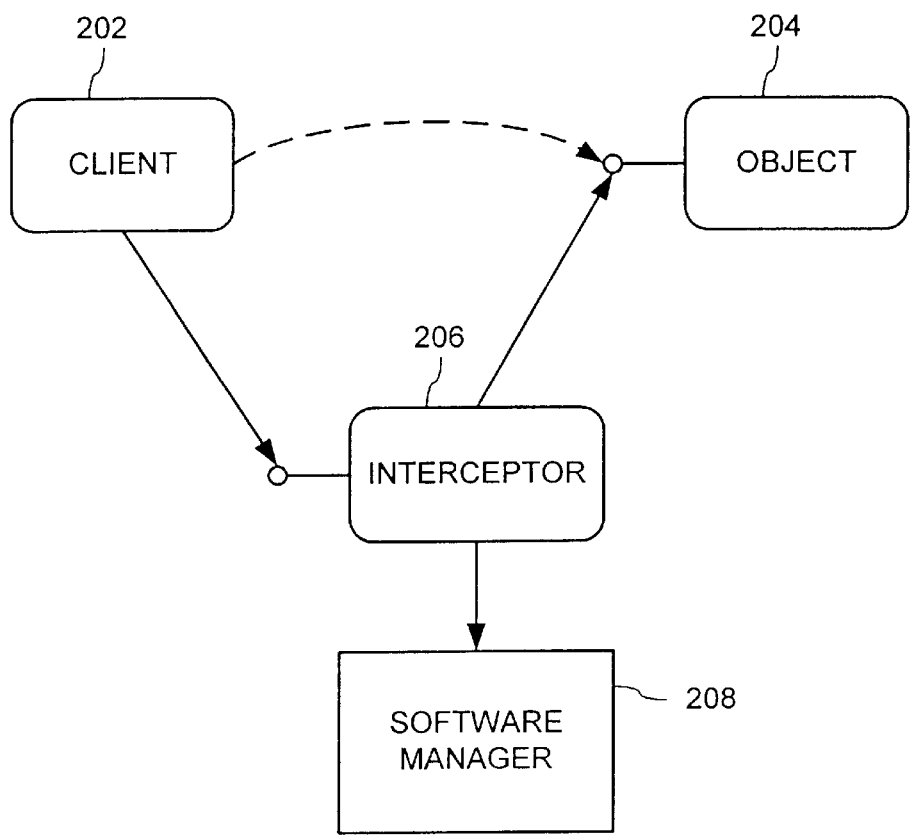
FIG. 3 is a block diagram showing an interceptor interposed between a client program and an object monitored by a software manager.

FIG. 3 depicts an exemplary monitoring arrangement. When a client program 202 (e.g., a calling object) performs an operation (e.g., a method invocation on an interface with particular parameters) on a monitored object 204, the operation is intercepted by an interceptor 206, which sends operational management information to a software manager 208 and forwards the operation to the monitored object 204. The interceptor 206 can also intercept information directed by the object 204 back to the client program 202 (e.g., a value returned from a method call) and generate appropriate operational management information (e.g., indicating the method call has returned and the value returned). A variation on this arrangement (not shown) divides the logic of the interceptor into a proxy and a stub component, both of which can generate operational management information; the proxy and stub can reside in two different processes or on two different computers.

Figure 4:
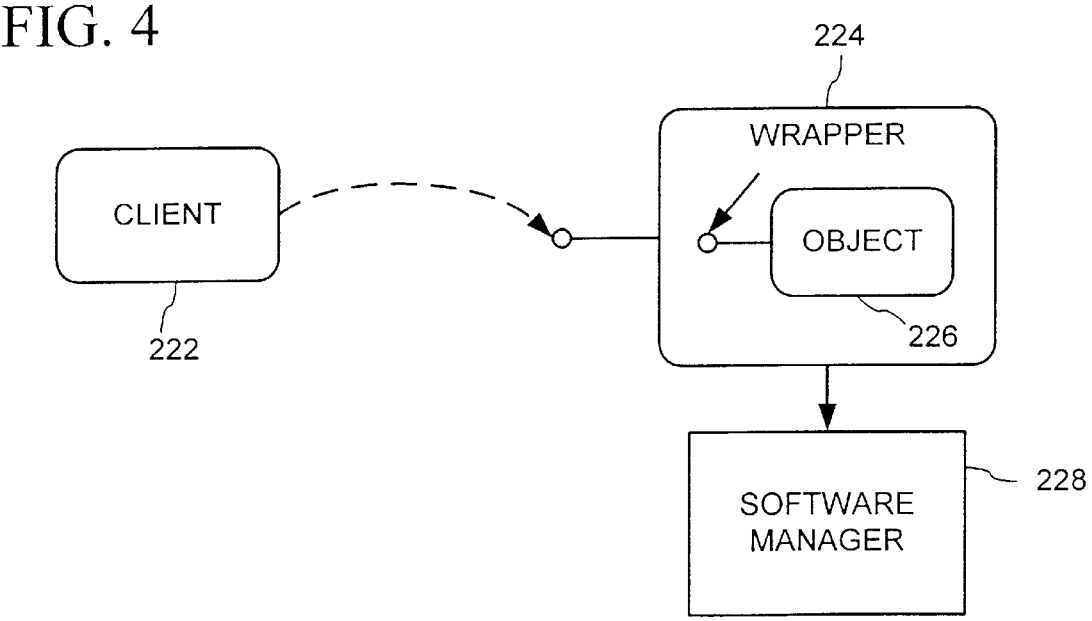
FIG. 4 is a block diagram showing a wrapper interposed between a client program and a software object monitored by a software manager.

FIG. 4 shows an alternative depiction of a monitoring arrangement. The wrapper 224 wraps the monitored object 226; external interactions with the monitored object 226 pass through the wrapper 224, which sends operational management information to a software manager 228 based on interaction between the wrapped object 226 and the client 222. The wrapper 224 can also direct operational management information to the software manager 228 when the monitored object 226 directs operations back to the client 222 (e.g., a return from a call on a method). Although the wrapper 224 is graphically depicted as wrapping the entire object 226, it may instead wrap one or more interfaces of the object. Thus, two wrappers may wrap the same object 226, each covering the same or different interfaces of the object 226. Thus, two wrappers may wrap the same object 226, each covering the same or different interfaces of the object 226

The operational management information generated by the interceptor 206 or the wrapper 224 generally indicates the particular interaction between a client and a monitored software object. For example, the information could indicate that a particular method of a particular interface was called. Optionally, the information may provide more detail, such as the parameters used during the method call.

Under either scenario, the monitored software object 204 or 226 need not contain logic for generating or sending operational management information. Thus, the developer of the monitored software object can write code for the monitored software object without knowledge of the enterprise software management arrangement or architecture.

Another way to describe the monitoring arrangement is by calling it "run time instrumentation of an object-based program." In other words, logic for generating and sending operational management information is inserted at program run time. Again, the developer avoids incorporating logic for generating or sending operational management information to a software manager because the illustrated architecture automatically does so at run time.

The monitoring arrangement could also be described as instrumentation of an object execution environment external of the objects. In other words, the execution environment is instrumented to generate notifications upon interaction with the objects. Again, the software developer avoids incorporating operational management logic in software objects because such logic resides outside the objects, in the execution environment.

The operational management information represents operational management metrics (measurements of the operation of the objects). These metrics are collected by a software manager, which can keep a log of activity on the monitored objects. As explained in a later section, two pieces of information are particularly helpful in the field of enterprise software management: the program originating the metrics the activity originating the metric. The collected (or "primary") operational management metrics can be transformed into other (or "derived") metrics (e.g., average response time for customer orders). A management console can present the metrics graphically to provide a comfort (or "heartbeat") screen (e.g., displaying number of transactions per minute) to provide visual confirmation of normal operation. In addition, various alerts can be configured to warn an administrator when a metric falls outside of a particular threshold. Finally, the log of events can prove useful for determining what caused a machine to crash (sometimes called "postmortem analysis"). If, for example, the last entry for a crashing server computer indicates a customer placed an order for 7.2 million widgets, it is likely that the program crashed because some portion of the software was unable to handle such a large quantity.

Overview of Software Management Architecture

Figure 5:
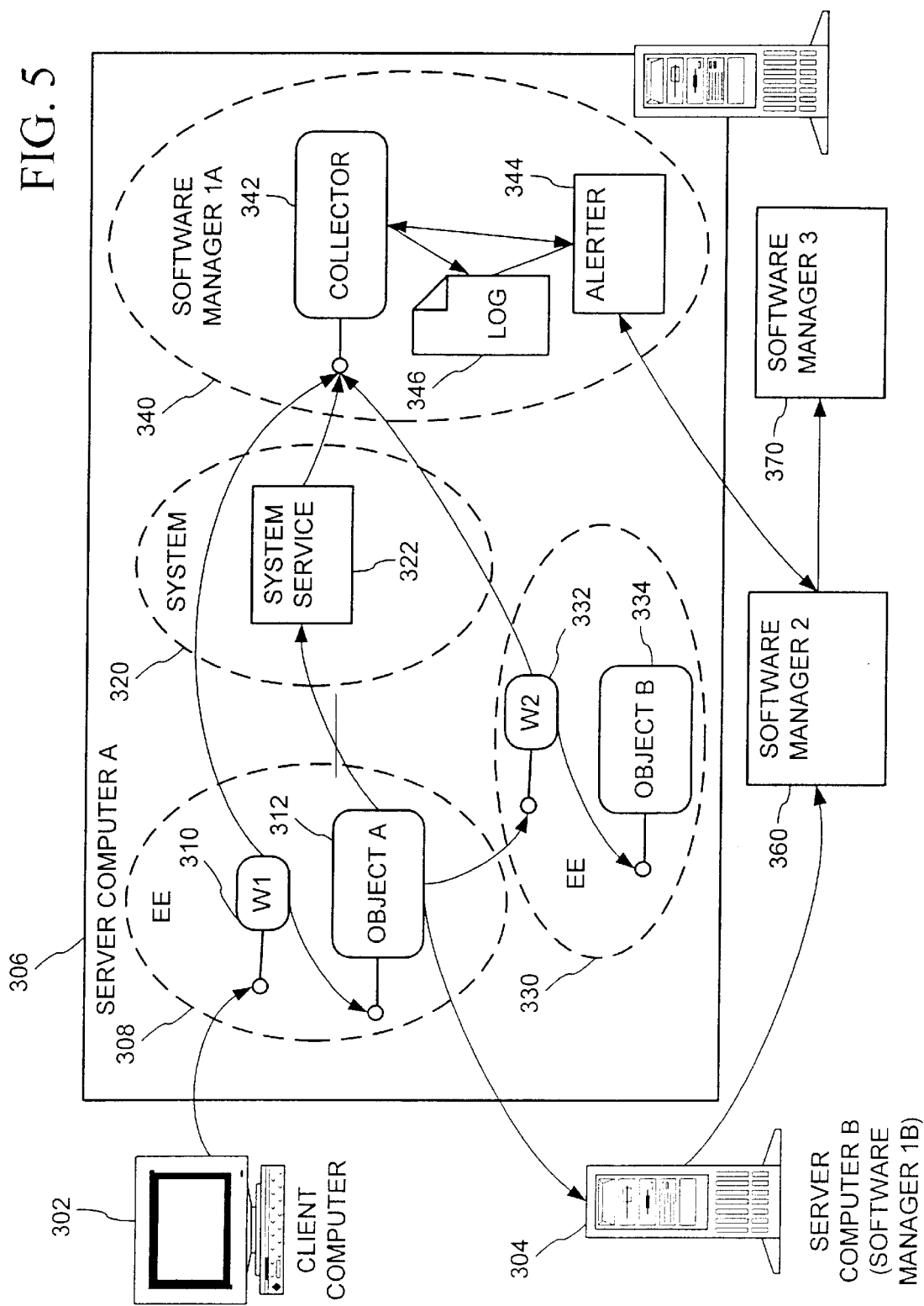
FIG. 5 is a block diagram showing an architecture for implementing an enterprise software management system transparently to monitored software objects.

An overview of an architecture used to collect operational management information is shown at FIG. 5. A monitored software object 312 runs in an execution environment 308 on a server computer 306. When a client program at the client computer 302 wishes to access the functionality of the monitored software object 312, it typically requests a reference (e.g., an interface pointer) to the monitored software object 312. In the illustrated architecture, a reference to the proxy object 310 is instead provided to the client program at the client computer 302.

Consequently, when the client program at the client computer 302 wishes to perform an operation on the monitored software object 312 (e.g., a method call), the client program at the client computer 302 does so via the reference to proxy 310 (e.g., using the normal method call semantics of COM described above). The proxy 310 then both performs the action on the monitored software object 312 and directs a notification to the collector 342 in the software manager 340. As the software object 312 performs work, it may access the functionality of another software object 334 executing in another (or the same) execution environment 330 through a proxy 332, which may also direct a notification to the collector 342. Additionally, if the monitored software object 312 accesses a system service 322 running in a system process 320, the system service 322 may direct additional notifications to the collector 342. Finally, the monitored software object 312 may invoke the functionality of a monitored software object on a remote server 304; the monitored software object on the remote server 304 directs a notification to a software manager running on the remote server 304. The notification could be sent back to the server computer 306 and collected by collector 342.

Notifications received by the collector 342 are typically recorded in a log 346. The software manager 340 further comprises an alerter 344, which monitors notifications and generates an alert (e.g., to a system administrator or to an automated management agent) when particular conditions are met. If, for example, the notifications include an activity identifier, an alert can be generated when notifications indicate certain conditions (e.g., no notifications or more than x notifications per minute) for a certain activity.

In addition, the alerter 344 of the software manager 340 can provide notifications to other software managers at positions higher in a hierarchy, such as the software manager 360. These notifications can be either forwarded notifications (e.g., from the wrapper 310) or generated anew based on specified conditions. Similarly, the server computer 304 can also direct notifications to the software manager 360. In this way, a single software manager 360 can monitor the operation of a program, even if its components are software objects spread out over plural machines 306 and 304. In the illustrated example, each software manager 304, 340, 360, and 370 is on a different computer; however, plural software managers can reside on the same computer. Thus, one computer could serve as a software manager both for a particular computer and a set of computers including the particular computer. Finally, an alternative architecture might accommodate monitoring a computer not having a software manager. For example, notifications could be sent from a system process 320 to a software manager on a remote server 304.

As the software manager 360 receives notifications, it can in turn provide notifications to other software managers still higher in the hierarchy, such as the software manager 370. Thus, for example, a low-level software manager might provide a notification to an intermediate-level software manager when a program begins to exhibit poor performance and when the program fails. The intermediate-level software manager might only forward notifications to a high-level software manager when the program fails. Thus, the high-level software manager can monitor program availability across an enterprise without receiving all notifications.

Overview of Software Management Operation

Figure 6:
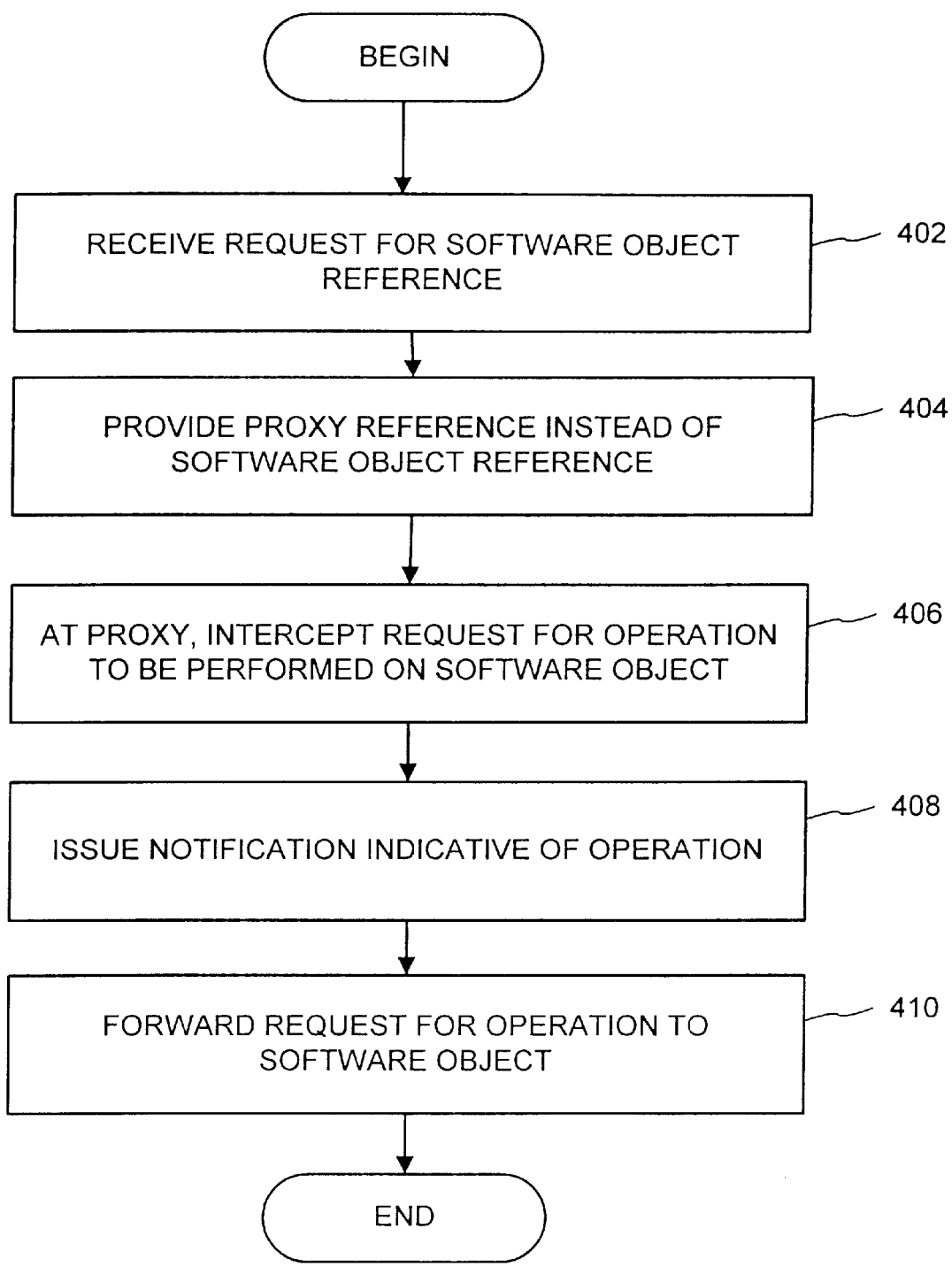
FIG. 6 is a flowchart showing a method for collecting notifications transparently to the software objects being monitored.
Figure 7:
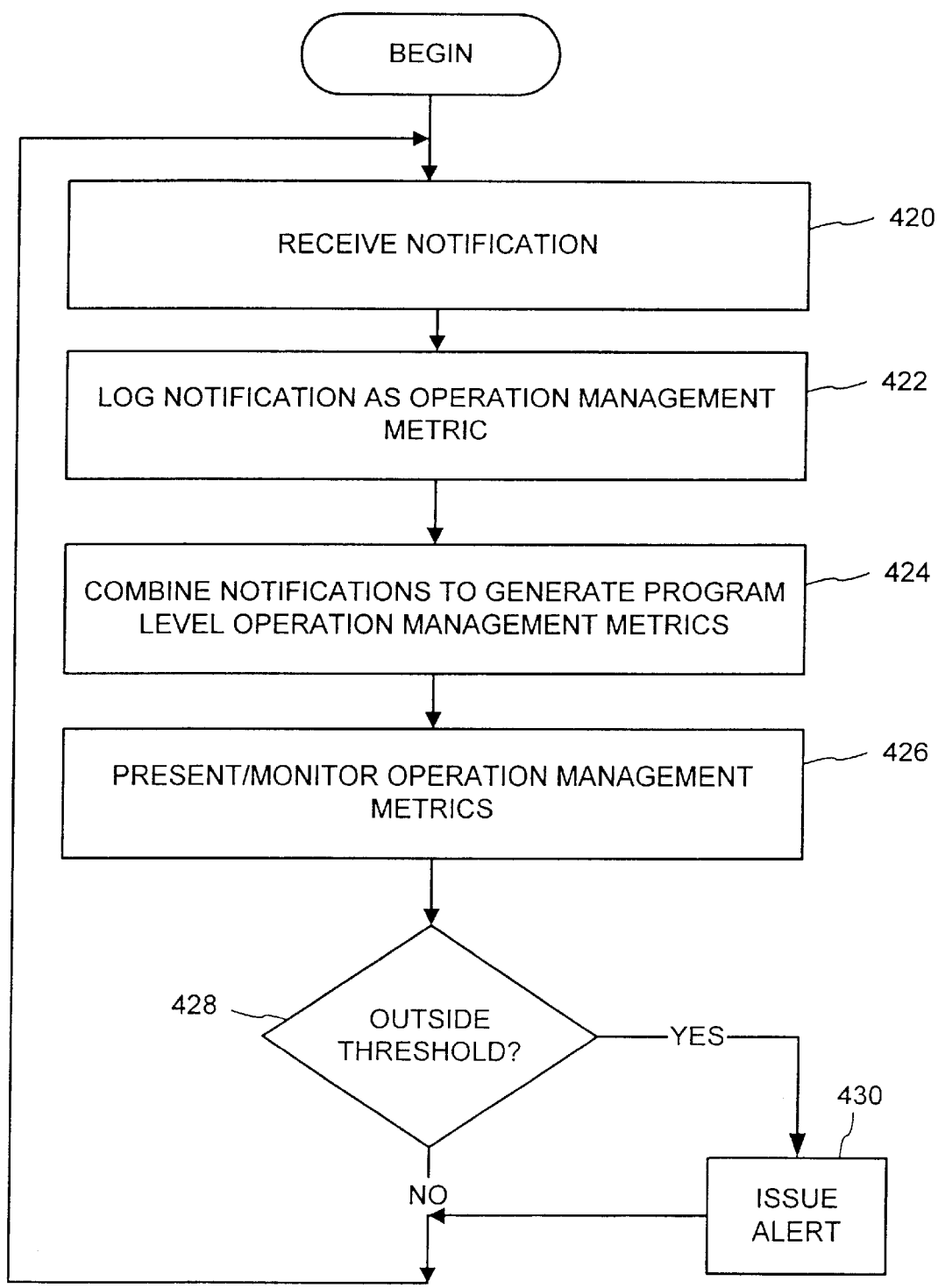
FIG. 7 is a flowchart showing a method for collecting and monitoring notifications generated by a method such as that shown in FIG. 6.

An overview of a method used to collect operational management information for software management is shown at FIGS. 6 and 7. Generally, FIG. 6 depicts a method for sending notifications to a software manager; FIG. 7 depicts a method for handling the notifications.

With reference now to FIG. 6, a request is received by an object request service for a software object reference (box 402). Instead of providing a reference to a software object, the object request service provides a reference to a proxy (box 404). A request for an operation to be performed on the object is intercepted at the proxy (box 406). The proxy then issues a notification indicative of the operation (box 408) and forwards the request for the operation to the software object (box 410). In such an arrangement, the proxy serves as an interceptor (such as the interceptor 206 in FIG. 3) or wrapper (such as the wrapper 224 in FIG. 4) or both; however, some other interceptor or wrapper could be used as an alternative to the proxy. Similarly, when the software object performs an operation (e.g., a method return), the proxy intercepts the operation, issues a notification, and forwards the operation. Thus, the proxy can monitor various interactions with the object, including both operations performed on and by the software object.

With reference now to FIG. 7, the notification sent in box 408 (FIG. 6) is received at box 420. The notification is then logged (box 422) and combined with other notifications to generate program-level operational management information (box 424). The program-level operational management information is presented, monitored, or both (box 426); if a particular metric falls outside a threshold (box 428), an alert is provided (box 430). The alert may be in the form of an action taken to notify a system administrator (e.g., an email) or an event sent to a software manager at a higher position in a software manager hierarchy.

Generating Notifications in the Software Management Architecture

On a general level, a program is monitored by observing the interactions with monitored software objects comprising the program. When an interaction with a monitored software object takes place, a notification is directed to a software manager. Further, when objects request certain system functions, a notification is directed to the software manager. In the illustrated exemplary embodiments, these notifications are generically called operational management metrics because they provide measurements useful for managing the operation of monitored software objects. The software manager in turn transforms (or "munges") the notifications into program-level operational management metrics by, for instance, resolving timestamps and references between the metrics. The operational management metrics can be monitored by an administrator or an automated monitor.

With reference now to the overview of a software management architecture shown at FIG. 5, a particular implementation of the architecture places a monitored software object (e.g., object 312) in an object context. Object contexts are an environment extensibility mechanism described at length in Thatte et al., "Environment Extensibility and Automatic Services For Component Applications Using Contexts, Policies And Activators," U.S. patent application Ser. No. 09/135,397, filed Aug. 17, 1998, the disclosure of which is incorporated herein by reference. In such an embodiment, the wrapper 310 is a proxy object, which generates a notification and forwards the method invocation to the monitored software object. Thus, the object contexts are used to automatically generate notifications transparently to the monitored object when a client program from another context (e.g., on another computer or in another process) directs a method invocation to the monitored object.

The proxy is automatically put into place by an object request service for cross-context calls if the software object is designated as a monitored software object. The object can be so designated by configuring a catalog of object information residing on the computer on which the object executes. The catalog can be configured to monitor particular objects or all software objects for a particular application or other program (i.e., a monitored program). In one implementation, if the catalog indicates the object is monitored, a policy is included in the policy set of the object context; the policy generates notifications. In another implementation, the proxy contains code to determine whether the object has been designated as monitored, and the proxy generates notifications.

Figure 8:
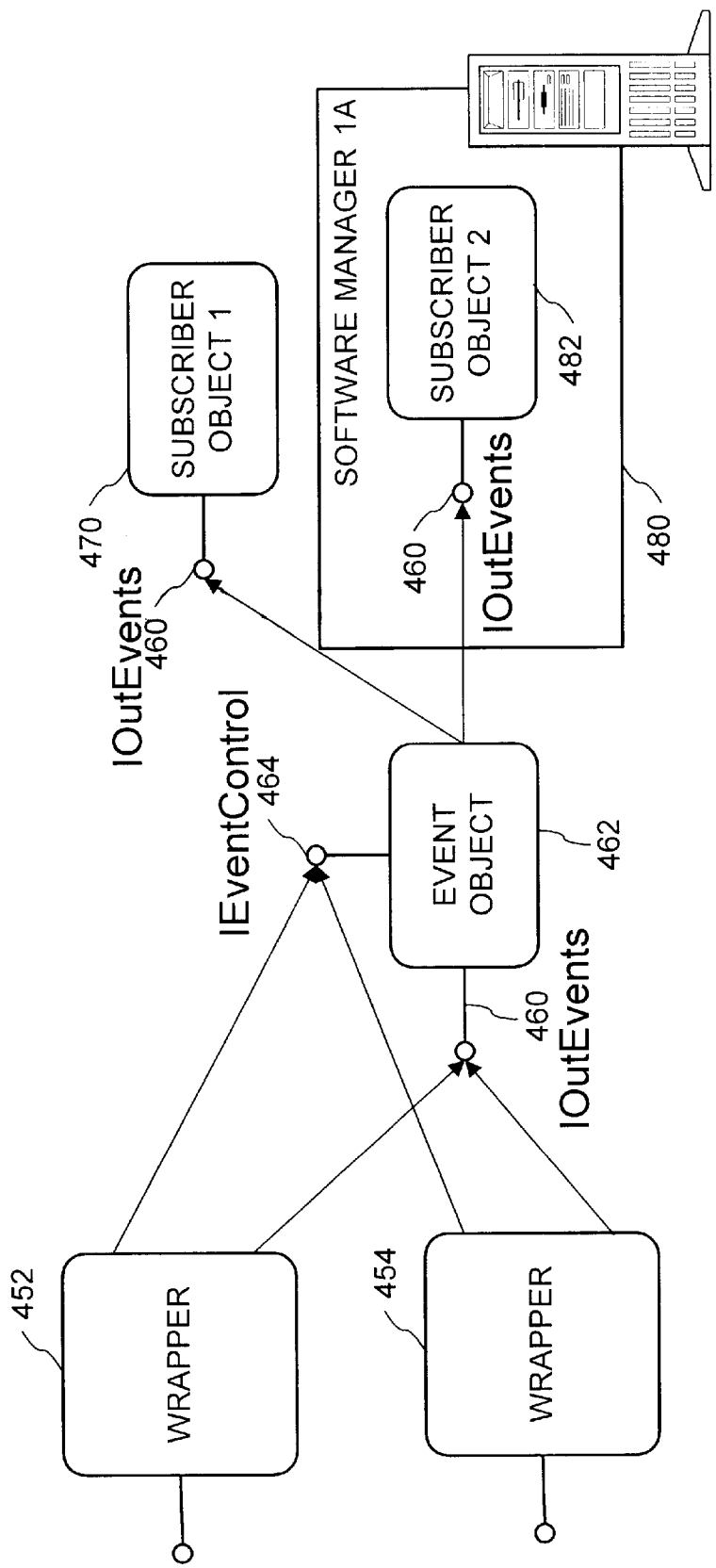
FIG. 8 is a block diagram showing a model for collecting notifications in a loosely coupled publish and subscribe event arrangement.

A variety of arrangements can be used to direct operational management metrics to a software manager. In one implementation, notifications are events fired by an event publisher in a loosely coupled publish and subscribe arrangement. Loosely coupled publish and subscribe events are described in Hinson et al., "Object Connectivity Through Loosely Coupled Publish and Subscribe Events," U.S. patent application Ser. No. 09/247,363, filed Feb. 23, 1999, the disclosure of which is incorporated herein by reference. Such an arrangement is shown generally in FIG. 8. The wrappers 452 and 454 become publishers via the interface IEventControl 464, then fire events to the event object 462 through the interface IOutEvents 460. The event object 464 distributes the events to various subscribers, such as a software manager 480. The subscribers 470 and 482 subscribe to a set of events by adding a subscription to a subscription set; the event object 462 then sends the events to the interface IOutEvents 460 of the objects 470 and 482. Since the identity of the subscriber is stored in the subscription, the publisher need have no a priori knowledge of a subscriber's identity; also the lifetime of the publisher need not overlap that of the subscriber.

Such an arrangement has several advantages in enterprise software management. One advantage is that a custom software manager (e.g., a third party plug in or a user program) can monitor the notifications in addition to or instead of the provided software manager 480. Other software managers are easily incorporated into the architecture because they need only register a subscription to appropriate events in order to receive notifications for the monitored program's objects. Thus, a program can monitor its own performance using the software management architecture and avoid incorporating logic for generating notifications into the program. As a result, the software management architecture provides program monitoring with logic residing outside and transparent to the program.

Figure 9:
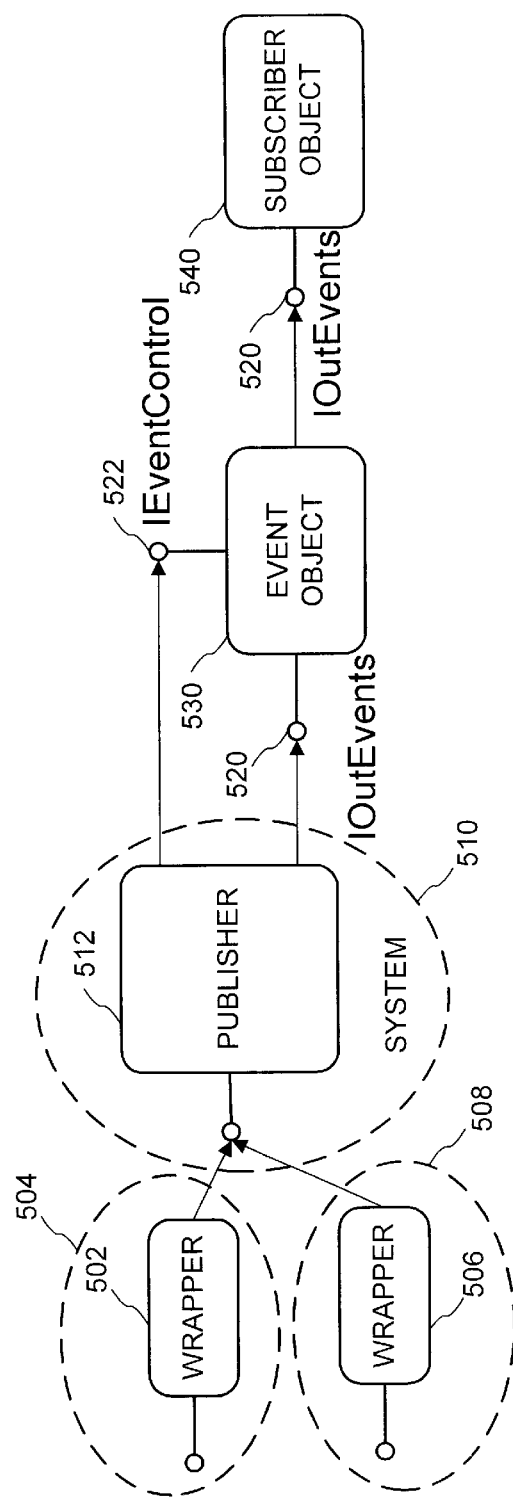
FIG. 9 is a block diagram showing a model for collecting notifications in a loosely coupled publish and subscribe event arrangement using an intermediary system publisher.

Alternatively, an intermediate collector (e.g., in a system process) can be provided to collect notifications before publishing them. For example, as shown in FIG. 9, a publisher 512 in a system process 510 collects notifications from the wrapper 502 in the process 504 and the wrapper 506 in the process 508, and publishes the notifications as events. The publisher 512 accesses the interfaces 522 and 520 of the event object 530, which sends the events to a subscriber object 540 through the interface 520. The arrangement may or may not expose the intermediate interfaces (e.g., the interface to the publisher 512). Such an arrangement avoids creating numerous publishers; there is but one publisher per computer (or, alternatively, per program). However, the arrangement still benefits from the advantages of a loosely coupled publish and subscribe event model.

Figure 10:
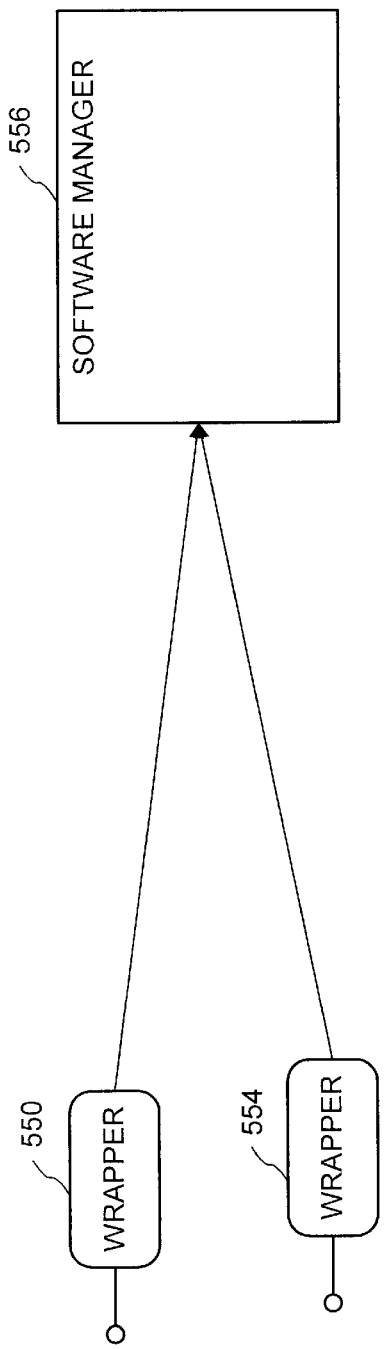
FIG. 10 is a block diagram showing a model for collecting notifications in a tightly coupled notification arrangement.

Yet another alternative is to send a notification directly to a software manager without employing the loosely coupled arrangement. Such an arrangement is shown in FIG. 10, in which wrappers 550 and 554 send notifications directly to a software manager 556 in a tightly coupled arrangement. Thus, the term "notification" includes direct notification, an event published according to a loosely coupled publish and subscribe arrangement, or a notification to a system process, which publishes an event in response to the notification.

Another useful feature of the illustrated arrangements involving subscriptions is that semantically-related operational management metrics can be placed into various groups, for which individual subscriptions can be registered. For example, a subscription to metrics related to transactions (e.g., transaction started, transaction completed, and transaction aborted) can be registered separately from metrics related to methods (e.g., method call, method return, and method exception). This feature accommodates dynamic operational management metric selection. In other words, the metrics selected for monitoring by a software manager can be changed at run time. For example, if transaction information indicates that too many transactions are aborting, method-level monitoring can be started to study object behavior and determine why so many transactions are aborting. Thus, the architecture avoids sending excessive notifications to the software manager when the program is functioning normally.

Notification Contents

The notifications provided to a software manager contain information useful for monitoring program performance. For example, a timestamp in the notification allows tracking of various time-based metrics. Also, including information identifying the program responsible for generating the notification (e.g., which program caused a method call) enables the information to be grouped by program.

Another useful way of grouping the information is by activity. An activity is a unit of work composed of the tasks to be completed to form one user level interaction. For example, if a user clicks an "order" button, the activity of processing the order begins; when the order processing is completed and the user has been notified of the result, the activity ends. Each activity is identified by an activity identifier (a GUID). Notifications generated while performing the work to complete the activity (e.g. calling a method, instantiating a software object, allocating threads and memory, accessing a database, and completing a transaction) are associated with the activity via the activity identifier. The software manager can then generate information based on notifications collected for the activity. The activity information can help determine which activities are most popular and what resources are consumed by what activities. Such information is particularly useful for tuning program performance. Finally, since the activity information correlates with a user interaction, tracking activity performance roughly corresponds to the user's perception of program performance.

The architecture also supports user-defined notifications to accommodate functionality not covered by the other events. Thus it would be possible, for example, to generate a plug in software manager which monitors a program in a very specialized way.

Finally, the notifications can contain information to facilitate combining them. For example, a "transaction started" metric might contain a key referenced by a "transaction completed" metric. Thus, the notifications can be recognized as related.

Handling Notifications in the Software Management Architecture

As notifications from various sources arrive at a software manager, they are logged as primary operational management metrics and transformed into derived operational management metrics. For example, two notifications indicating when a transaction started and completed can be transformed into a metric indicating average transaction completion time and transactions completed per minute. Program-level operational management metrics indicate performance of a particular program, and may be derived from primary operational management metrics originating from plural computers.

The log of notifications is useful in assisting in a variety of software management tasks. Since notifications are associated with an activity and a program, it is possible to examine log entries to determine the source of various problems. For example, the last entry for a particular program can be examined in a post mortem analysis to determine why the program crashed. The log can also be used as a source of information to generate custom reports.

Figure 11:
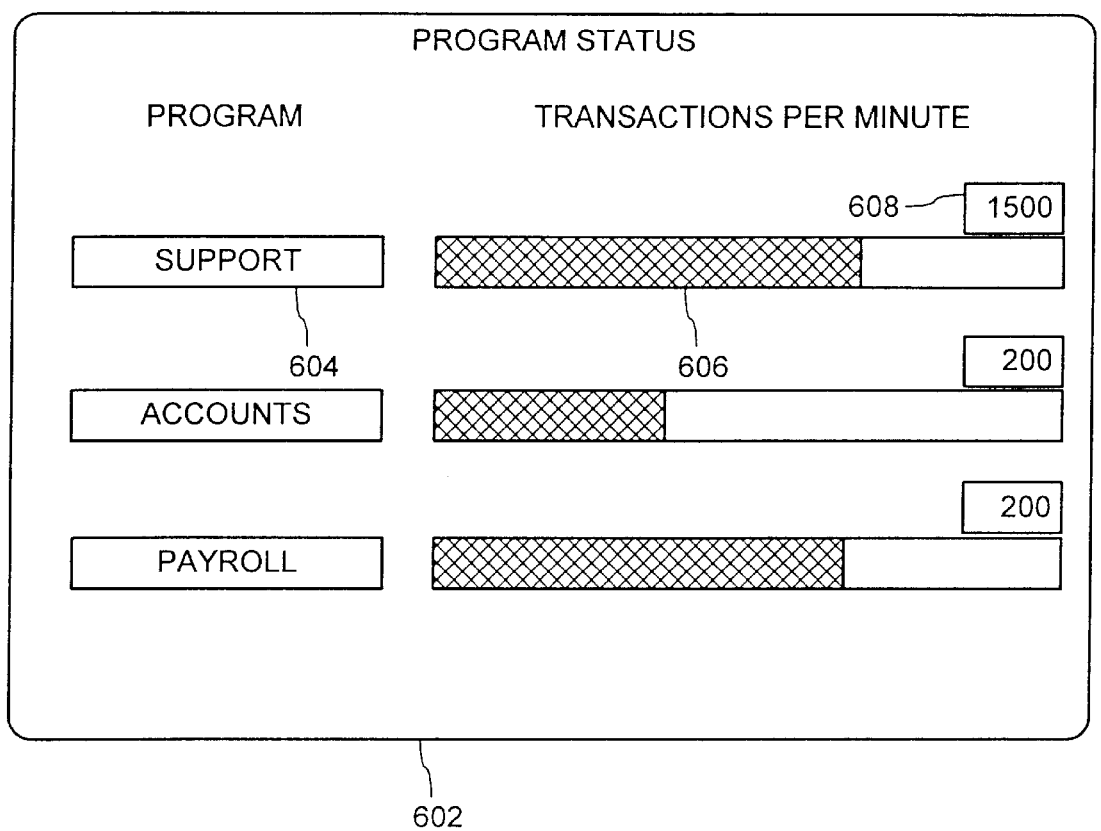
FIG. 11 is a view of a user interface providing visual confirmation of programs' normal operation.

The software manager can additionally present operational management information graphically. For example, a user interface 602 commonly called a "comfort screen" (because it assures an administrator that operations are proceeding normally) is shown in FIG. 11. This interface provides an indication of the operation (or "heartbeat") of the programs being monitored. For each monitored program, a selectable button 604, a thermometer 606, and a ceiling value 608 are displayed. The thermometer 606 shows the percentage of the ceiling value 608 exhibited by the program-level operational management metric. The program-level operational management metric can be one generated by monitoring a program scattered across plural computers (e.g., plural instances of order processing software objects for an order processing application or instances of various software objects for a banking application). By selecting the selectable button 604, a system administrator can navigate to an analysis screen for the associated program. In this way, the software manager provides a running indication of program availability and provides an easy way to navigate to a more detailed view showing an analysis screen associated with the program. Thus, the user interface 602 is a useful interface for presentation to a system administrator during day-to-day operations.

Finally, the software manager can be configured to generate a variety of alerts when program-level operational management metrics go outside specified thresholds or if a particular event is received. Alerts can take various forms, such as changing a screen condition (e.g., highlighting an icon representing a program or server), sending an email, or paging an administrator. Alerts can also be used to communicate from one software manager to another, as described in more detail below.

Software Manager Hierarchy

Figure 12:
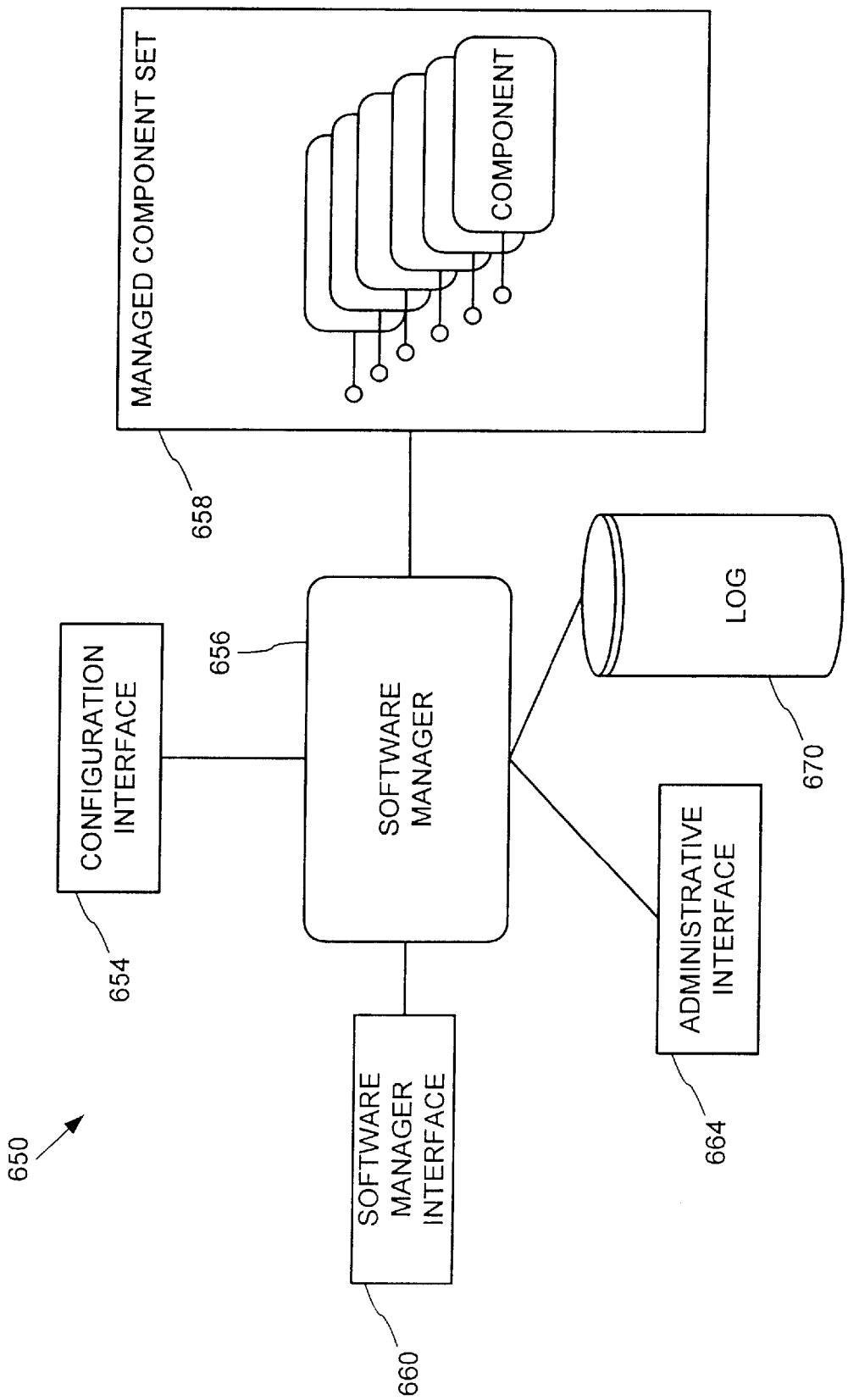
FIG. 12 is a block diagram showing a software manager and accompanying interfaces.

Software Managers can be connected together in a hierarchical fashion to facilitate enterprise software management. With reference now to FIG. 12, an exemplary basic building block in an enterprise software management system is shown as a managed unit 650. The managed unit 650 comprises the managed component set 658 and a software manager 656 responsible for managing the managed component set 658. The managed unit 650 further comprises interfaces 654, 660, and 664 to the software manager 656.

A configuration interface 654 facilitates configuration of various software manager 656 features (e.g., alerts). The software manager interface 660 serves as a sender and a recipient of events to and from other software managers, as shown in more detail below. The administrative interface 664 allows a user (e.g., a system administrator) to examine the log 670 and other information collected and generated for the managed component set 658.

Figure 13:
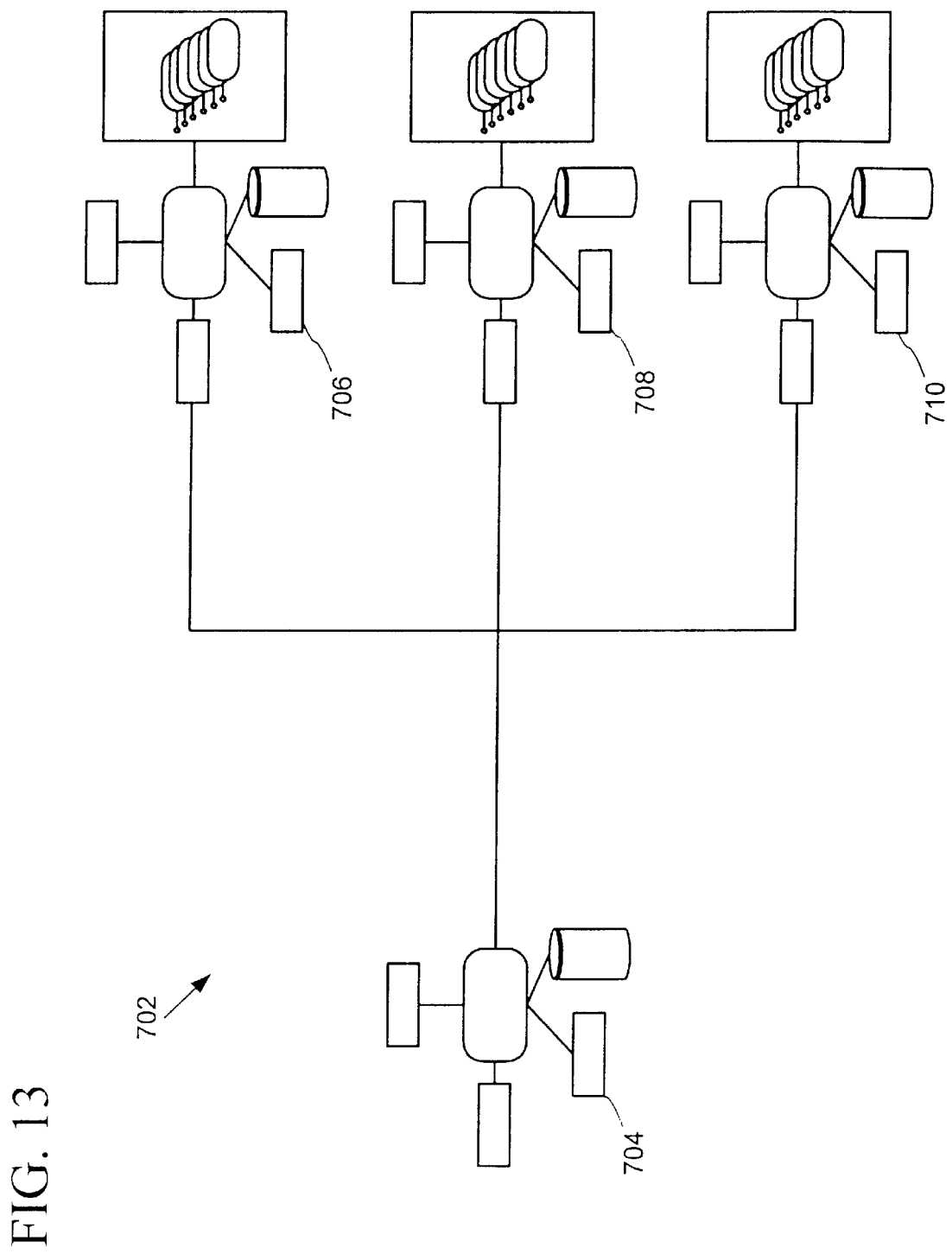
FIG. 13 is a block diagram showing a hierarchical arrangement of software managers.

As shown in FIG. 13, software managers can be arranged in a hierarchical fashion to provide an enterprise software management system 702. The managed units 706, 708, and 710 are monitored by a software manager in the managed unit 704. From one of the lower level managed units (706, 708, or 710), alerts can be sent through the software manager interface 660 (FIG. 12) of a higher level managed unit 704. For example, if too many transactions for a particular program are aborting, the managed unit 706 may alert the managed unit 704 so a system administrator monitoring several programs at various locations will be provided an alarm. The alerts can also be used for communication between the managed units. For example, a managed unit 708 may provide the higher-level managed unit 704 with an update on the number of transactions completed per minute for a particular program. The frequency of this communication can be varied by the system administrator.

Software Manager Implementation

Figure 14:
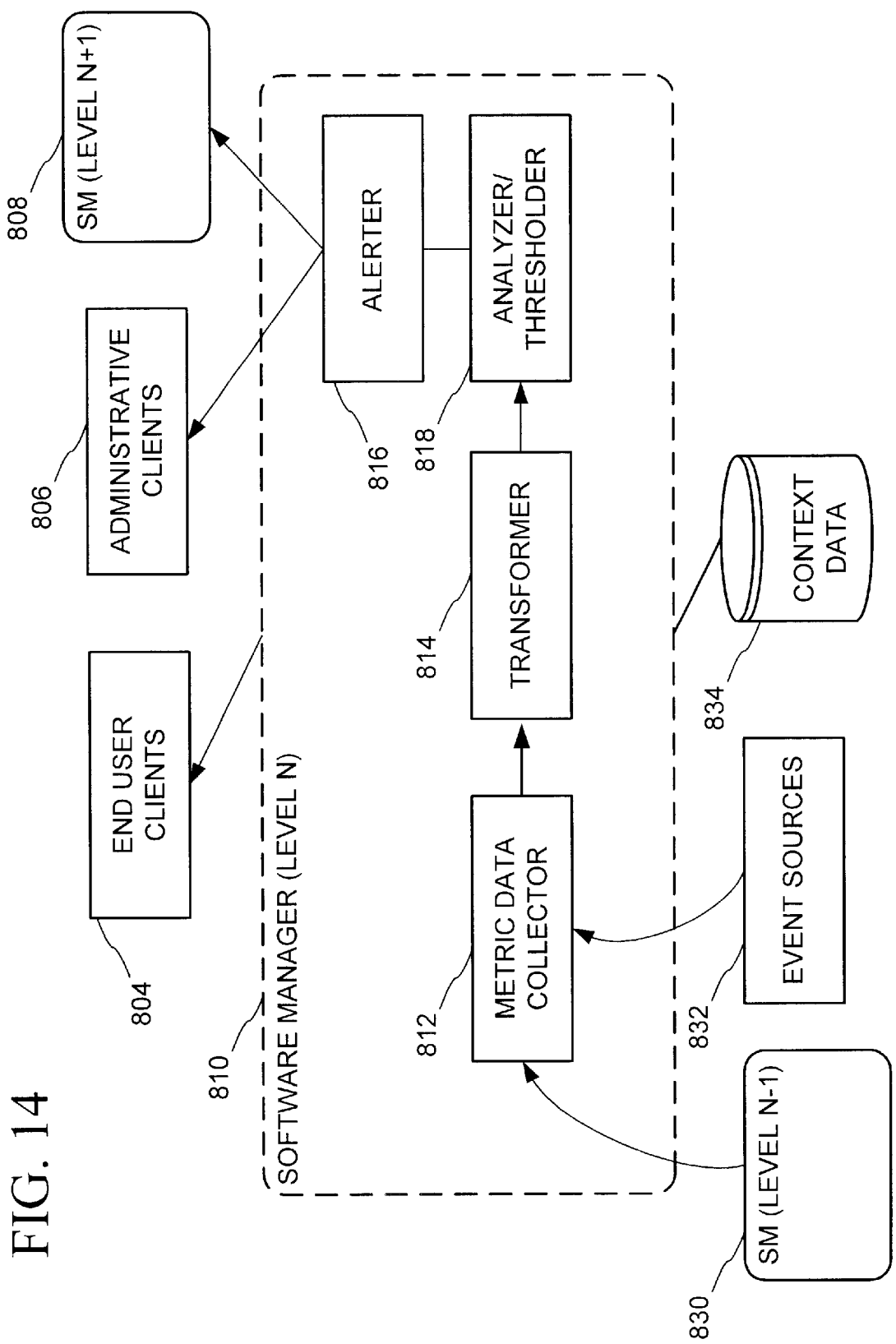
FIG. 14 is a block diagram showing a software manager and information flow into and out of the software manager.

FIG. 14 shows an exemplary implementation of a software manager 810. The metric data collector 812 is a subscriber to events from software managers at lower levels (e.g., the software manager 830) and other event sources 832 (e.g., events generated by a transaction server, the system, object wrappers, and programs local to the software manager 810).

The transformer (or "munger") 814 transforms the metrics into program-level operational management metrics for analysis by the analyzer/thresholder 818. For example, timestamp information for plural metrics is converted into elapsed time to determine an activity completion time, and various metrics are grouped by program. Context data 834 derived from a monitored object's object context object can be utilized during the transformation process.

The analyzer/thresholder 818 further filters the metrics to determine whether they should be fed to the alerter 816, which can publish events to administrative clients 806 or subscribing software managers at higher levels (e.g., the software manager 808). End user clients 804 can access the software manager 810 for examination and configuration. For example, an Internet connection could be used to remotely access and configure the software manager 810.

Other Features

The architecture can accommodate a wide variety of features not described above. For example, the architecture can monitor program security. If a notification is provided to the software manager when user authentication fails, an alarm can alert a remote administrator, who can take steps to stop a potential intruder or help a user who has forgotten a password.

Additionally, although various examples make reference to managing an application or other program, the architecture can monitor any software comprising a designated set of software objects. Thus, for example, instead of monitoring software objects for a particular application, the architecture can monitor software objects originating from a particular author or vendor.

Operational Management Metrics

Operational management metrics measure a managed operation. Each operation performed to do work for a managed program is a potential operational management metric. Thus, operational management metrics might measure a wide variety of actions related to program initialization, transactions, objects, object methods, object pooling, contexts, resource allocation, and security. For example, when an object's method is called to do work for a program, one potential operational management metric indicates the particular method called and a timestamp indicating when the method was called. The metric can also include information identifying the responsible program and activity to facilitate grouping and tracking a set of related metrics.

Operational management metrics representing direct measurements of interactions (e.g., a method call) with a software object are called "primary" operational management metrics. These primary operational management metrics can be combined using various mathematical formulas to derive other "derived" operational management metrics, which can in turn be combined to derive still others. Derivation is generally accomplished by combining plural operational management metrics into a set and performing a calculation on the set. The calculation may comprise a set of mathematical operations (e.g., averaging, adding, subtracting, and counting). For example, a first metric indicating a timestamp of a method call and a second metric indicating a timestamp of the method return could be combined (by subtracting timestamps) into a third metric indicating the time required to complete the method call. Further, a set of such metrics could be combined and averaged to indicate an average time required to complete a method call. Or, the number of transactions completed per minute can be derived by counting the number of "transaction completed" metrics showing appropriate timestamps.

Program-level operational management metrics are generated by combining a set of metrics for a single program into a set and performing a calculation on the set. For example, metrics showing that transactions have been completed for a particular program could be grouped together to determine how many transactions per minute have been completed for the program, even if the program is scattered across plural computers.

The potential number of operational metrics is limitless, and the illustrated architecture accommodates user-defined events to facilitate user-created metrics not derivable using the other metrics provided by the architecture. The metrics, including user defined ones, can be monitored graphically or used to trigger alerts.

Exemplary Setup of the Software Management Architecture

In the illustrated exemplary setup, operational management metrics monitor a wide variety of object-related operations associated with software objects to determine application performance. The object-related operations include object creation, object method calling, method exception generation, object activation, and queuing a method call.

Sample Hierarchical Arrangement

Figure 15:
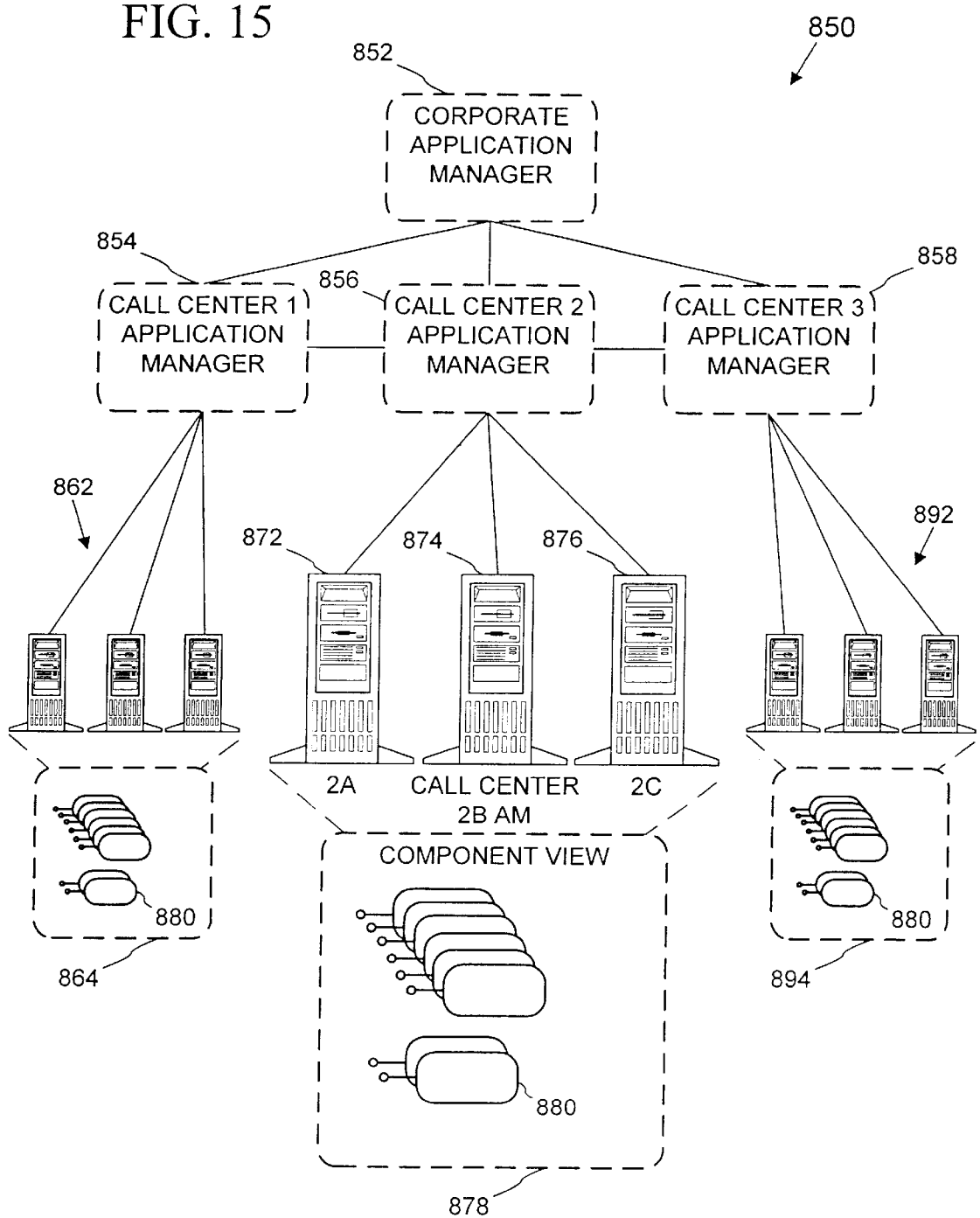
FIG. 15 is a block diagram showing an exemplary enterprise application management arrangement.

The scalability of the architecture is demonstrated by the arrangement shown in FIG. 15. An enterprise application management system 850 includes software managers at three levels: the corporate level (the application manager 852), the call center level (the application managers 854, 856, and 858), and the machine level (e.g., the application managers at each of the computers in the groups 862 and 892 and the computers 872, 874, and 876).

The management system 850 monitors the operations of the component sets 864, 878, and 894, which include payroll application components. In the illustrated arrangement, the application manager 854 administers the applications running on the computers in group 862 (the component set 864) and the payroll components 880 throughout the system 850 (i.e., at each of the component sets 864, 878, and 894). Events pertaining to the payroll components 880 received by the application managers 856 and 858 are sent to the application manager 854.

The application managers 856 and 858 administer their respective local applications (i.e., applications running at the computers 872, 874 and 876 for the application manager 856, and applications running at the computer group 892 for the application manager 858). Filtered management information is sent to the corporate application manager 852, which administers applications throughout the system 850.

Sample Log

Table 1 shows a sample log of entries from an application manager. A variety of filters can be applied to the log (e.g., show only those entries for a particular application), and the log can be used to generate custom reports.

TABLE 1

Log Entries

Application WebOrders Activated
    Process: $ps_x$; Time $t_x$; Application: $a_1$; Machine: $m_x$
Activity CustomerOrder Started
    Process: $ps_x$; Time $t_x$; Application: $a_1$; Machine: $m_x$
Transaction $t_x$ Started
    Process: $ps_x$; Time $t_x$; Application: $a_1$; Machine: $m_x$
Object of object class CLSID created in Context ctxt for Activity CustomerOrder in Transaction $t_x$ (ID: ObjectID)
    Process: $ps_x$; Time $t_x$; Application: $a_1$; Machine: $m_x$
Application TechSupport Activated
    Process: $ps_x$; Time $t_x$; Application: $a_2$; Machine $m_x$
Activity ProblemReport Started
    Process: $ps_x$; Time $t_x$; Application: $a_2$; Machine $m_x$
Method IID of object class CLSID called (ID: ObjectID)
    Process: $ps_x$; Time $t_x$; Application: $a_1$; Machine: $m_x$
Resource "Database Connection" created and allocated in a transaction (ID: ObjectID)
    Process: $ps_x$; Time $t_x$; Application: $a_1$; Machine: $m_x$
Method IID of object class CLSID called (ID: ObjectID)
    Process: $ps_x$; Time $t_x$; Application: $a_2$; Machine: $m_x$
Method IID of object class CLSID called (ID: ObjectID)
    Process: $ps_x$; Time $t_x$; Application: $a_1$; Machine: $m_x$
Method IID of object class CLSID returned (ID: ObjectID)
    Process: $ps_x$; Time $t_x$; Application: $a_1$; Machine: $m_x$

TABLE 1-continued

Log Entries

Method IID of object class CLSID returned (ID: ObjectID)
    Process: $ps_x$; Time $t_x$; Application: $a_2$; Machine: $m_x$
. . .
Transaction $t_x$ committed
    Process: $ps_x$; Time t; Application: $a_1$; Machine: $m_x$
Activity CustomerOrder Finished
    Process: $ps_x$; Time t; Application: $a_1$; Machine: $m_x$
. . .
Application WebOrders shut down
    Process: $ps_x$; Time t; Application: $a_1$; Machine: $m_x$

Sample Events and Event Formats

An exemplary set of events is described in this section. Each of the events represents an operational management metric.

Each metric provides a standard structure COMSVCSEVENTINFO as its first value. The structure is shown in Table 2. The structure contains contextual information about the metric, such as the time it was generated, from which process and the software application responsible for its generation. Optionally, the COMSVCSEVENTINFO structure may contain a version of the application, facilitating, for example, separately tracking test and production versions of the same application. A field other than or in addition to the application responsible for generating the metric could be included in the structure. The architecture thus accommodates monitoring any set of software objects placed into a logical group.

A metric key field can be referenced by other metrics for correlation. Specifically, value stored in the key field of a first metric is stored in the reference field of other related metrics to relate the first metric with the others.

TABLE 2

COMSVCSEVENTINFO structure

| | |
|---|---|
| DWORD dwPid; | process id from which the event originated |
| LONGLONG lTime; | Coordinated Universal Time of event as seconds elapsed since midnight (00:00:00), January 1, 1970 |
| LONG lMicroTime; | microseconds added to tTime for time to microsecond resolution |
| LONGLONG perfCount; | |
| GUID guidApp; | the application GUID for the first component instantiated in dwPid |
| LPOLESTR sMachineName; | fully qualified name of the machine where the event originated |

The individual metrics are divided into groups as shown in the tables below. Each group can be individually subscribed. Instead of grouping by type of operation performed, the metrics could be grouped, for example, by level of detail revealed by the metric. Thus, metrics providing a general measurement of application performance could be placed in a group different from those providing detailed measurements. Such an arrangement would permit an application manager to automatically subscribe to the more detailed metrics upon detection of a problem as revealed by the general metrics. The system illustrated below supports such a scheme in that, for instance, method metrics can be individually subscribed after detecting a problem with transaction metrics.

Metrics in relation to operations performed at objects are generated at various times of the objects' lifetimes. For example, when an object is created, a metric is generated having a key field, a data field denoting the time the object creation was observed, and a data field identifying the application for which the object is performing work. Subsequently, when a method call is performed on the object, the system generates a second metric having a reference to the key and a data field denoting the time the method call was observed. The metrics can thus be correlated using the key and reference fields.

TABLE 3

Application Metrics

OnAppActivation   Generated when an application server is loaded
    COMSVCSEVENTINFO * pInfo
    GUID guidApp    GUID for the Application
OnAppForceShutdown   Generated when an application server is shut
        down through the operator's console
    COMSVCSEVENTINFO * pInfo
    GUID guidApp
OnAppShutdown   Generated when an application server shuts down
    COMSVCSEVENTINFO * pInfo
    GUID guidApp

TABLE 4

Activity Metrics (Activities are logical synchronization units)

OnActivityCreate   Generated when an activity starts
    COMSVCSEVENTINFO * pInfo
    REFGUID guidActivity    KEY - identifies the activity
OnActivityDestroy   Generated when an activity is finished
    COMSVCSEVENTINFO * pInfo
    REFGUID guidActivity    REFERENCES OnActivityCreate
OnActivityTimeout   Generated when a call into an Activity times out
    COMSVCSEVENTINFO * pInfo
    REFGUID guidCurrent    REFERENCES
        OnActivityCreate::GuidApp for caller
    REFGUID guidEntered    REFERENCES
        OnActivityCreate::GuidApp for the activity
        being entered (attempted entry)
    DWORD dwThread   WINDOWS 2000 thread ID executing the call
    DWORD dwTimeout Timeout period

TABLE 5

Tranaction Metrics

OnTransactionStart   Generated when a DTC (Distributed Transaction
        Coordinator) transaction starts
    COMSVCSEVENTINFO * pInfo
    REFGUID guidTx   KEY unique identifier for the transaction
    REFGUID tsid   KEY - unique identifier for correlation to objects
    BOOL fRoot   TRUE if this is a root transaction
OnTransactionPrepareGenerated on Prepare phase of a DTC transaction
    COMSVCSEVENTINFO * pInfo
    REFGUID guidTx   REFERENCES OnTransactionStart
    BOOL fVoteYes   How the Resource Manager generating the
        prepare voted
OnTransactionAbort   Generated when a transaction aborts
    COMSVCSEVENTINFO * pInfo
    REFGUID guidTx   REFERENCES OnTransactionStart
OnTransactionCommit   Generated when a transaction commits
    COMSVCSEVENTINFO * pInfo
    REFGUID guidTx   REFERENCES OnTransactionStart

TABLE 6

Object Metrics

OnObjectCreate   Generated when an object is created by a client
    COMSVCSEVENTINFO * pInfo
    REFGUID guidActivity    REFERENCES - OnActivityCreate

TABLE 6-continued

Object Metrics

```
REFCLSID clsid    CLSID for the object being created
REFGUID tsid    REFERENCES OnTransactionStart
ULONG64 CtxtID    KEY - Context for this object
ULONG64 ObjectID KEY - Initial JIT activated object
OnObjectDestroy    Generated when an object is released by a client
    COMSVCSEVENTINFO * pInfo
    ULONG64 CtxtID    REFERENCES - OnObjectCreate
OnObjectActivate    Generated when an object gets a new JITed
                object instance
    COMSVCSEVENTINFO * pInfo
    ULONG64 CtxtID        REFERENCES OnObjectCreate
    ULONG64 ObjectID KEY - JIT activated object
OnObjectDeactivate    Generated when the JITed object is freed
                (by SetComplete or SetAbort)
    COMSVCSEVENTINFO * pInfo
    ULONG64 CtxtID    REFERENCES OnObjectCreate
    ULONG64 ObjectID    REFERENCES OnObjectActivate
```

TABLE 7

Context Metrics

```
OnDisableCommit    Generated when the client calls DisableCommit on a
                context
    COMSVCSEVENTINFO * pInfo
    ULONG64 CtxtID    REFERENCES OnObjectCreate
OnEnableCommit    Generated when the client calls EnableCommit on a
                context
    COMSVCSEVENTINFO * pInfo
    ULONG64 CtxtID    REFERENCES OnObjectCreate
OnSetComplete    Generated when the client calls SetComplete on a
                context
    COMSVCSEVENTINFO * pInfo
    ULONG64 CtxtID    REFERENCES OnObjectCreate
OnSetAbort    Generated when the client calls SetAbort on a context
    COMSVCSEVENTINFO * pInfo
    ULONG64 CtxtID    REFERENCES OnObjectCreate
```

TABLE 8

Method Metrics

```
OnMethodCall    Generated when an object's method is called
    COMSVCSEVENTINFO * pInfo
    ULONG64 oid        REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    REFCLSID guidCid    CLSID for the object being called
    REFIID guidRid    IID of the method being called
    ULONG iMeth    v-table index of said method
OnMethodReturn    Generated when an object's method returns
    COMSVCSEVENTINFO * pInfo
    ULONG64 oid        REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    REFCLSID guidCid    CLSID for the object being called
    REFIID guidRid    IID of the method returning
    ULONG iMeth    v-table index of said method
OnMethodException    Generated when an object's method generates
                an exception
    COMSVCSEVENTINFO * pInfo
    ULONG64 oid        REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
```

TABLE 8-continued

Method Metrics

```
    REFCLSID guidCid    CLSID for the object being called
    REFIID guidRid    IID of the method generating the exception
    ULONG iMeth    v-table index of said method
```

TABLE 9

Resource Dispenser Management Metrics

```
OnResourceCreate    Generated when a NEW resource is created
                and allocated
    COMSVCSEVENTINFO * pInfo
    ULONG64 ObjectID REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    LPCOLESTR pszType        String describing resource being created
    ULONG64 resId    KEY - unique identifier for resource
    BOOL enlisted        TRUE if enlisted in a transaction
OnResourceAllocate    Generated when an existing resource is allocated
    COMSVCSEVENTINFO * pInfo
    ULONG64 ObjectID REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    LPCOLESTR pszType    String describing resource
    ULONG64 resId    REFERENCES OnResourceCreate
    BOOL enlisted        TRUE if enlisted in a transaction
    DWORD NumRated    Number of possible resources evaluated
                    for match
    DWORD Rating    The rating of the resource actually selected
OnResourceRecycle    Generated when an object is finished with
                a resource
    COMSVCSEVENTINFO * pInfo
    ULONG64 ObjectID    REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    LPCOLESTR pszType    String describing resource
    ULONG64 resId    REFERENCES OnResourceCreate
OnResourceDestroy    Generated when, a resource is permanently
                    removed from the resource pool
    COMSVCSEVENTINFO * pInfo
    ULONG64 ObjectID    REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    HRESULT hr Result from Resource Dispenser's Destroy
    LPCOLESTR pszType    String describing resource
    ULONG64 resId    REFERENCES OnResourceCreate
```

TABLE 10

Security and Authentication Metrics

```
OrAuthenticate    Generated when a method call level authentication
                succeeds
    COMSVCSEVENTINFO * pInfo
    REFGUID guidActivity        REFERENCES - OnActivityCreate
    ULONG64 ObjectID    REFERENCES OnObjectCreate::ObjectID,
                    OnObjectActivate::ObjectID,
                    OnObjPoolGetFromTx::objid,
                    OnObjectConstruct::objid or
                    OnObjPoolGetObject
    REFGUID guidIID    IID of the method
    ULONG iMeth    v-table:index of said method
    BYTE * pSidOriginalUser    SID of Original Caller
    BYTE * pSidCurrentUser    SID of Current Caller
    BOOL bCurrentUserInpersonatingInProc    TRUE if Current User
```

TABLE 10-continued

Security and Authentication Metrics

```
                                  is impersonating
OnAuthenticateFail   Generated when a method call level
                       authentication fails
     COMSVCSEVENTINFO * pInfo
     REFGUID guidActivity     REFERENCES - OnActivityCreate
     ULONG64 ObjectID    REFERENCES OnObjectCreate::ObjectID,
                                  OnObjectActivate::ObjectID,
                                  OnObjPoolGetFromTx::objid;
                                  OnObjectConstruct::objid or
                                  OnObjPoolGetObject
     REFGUID guidIID      IID of the method
     ULONG iMeth      v-table index of said method
     BYTE * pSidOriginalUser   SID of Original Caller
     BYTE * pSidCurrentUser    SID of Current Caller
     BOOL bCurrentUserInpersonatingInProc   TRUE if Current
                                  User is impersonating
OnIISRequestInfo   Generated when an activity is part of an IIS ASP
     COMSVCSEVENTINFO * pInfo
     ULONG64 ObjId       REFERENCES OnObjectCreate::ObjectID,
                                  OnObjectActivate::ObjectID,
                                  OnObjPoolGetFromTx::objid,
                                  OnObjectConstruct::objid or
                                  OnObjPoolGetObject
     LPCOLESTR pszClientIP    IP Address of IIS client
     LPCOLESTR pszServerIP    IP Address of IIS server
     LPCOLESTR pszURL     URL on IIS server generating object
                                  reference
```

TABLE 11

COM+ Object Pooling Metrics

```
OnObjPoolPutObject    Generated when a non-transactional object is
                          returned to the pool
     COMSVCSEVENTINFO * pInfo
     REFGUID guidObject     CLSID for the objects in the pool
     int nReason    Reserved - always 0
     DWORD dwAvailable      Number of objects in the pool
     ULONG64 oid      REFERENCES OnObjPoolGetObject
OnObjPoolGetObject    Generated when a non-transactional object is
                          obtained from the pool
     COMSVCSEVENTINFO * pInfo
     REFGUID guidActivity     REFERENCES - OnActivityCreate
     REFGUID guidObject     CLSID for the objects in the pool
     DWORD dwAvailable      Number of objects in the pool
     ULONG64 oid      KEY - the unique identifier for this object
OnObjPoolRecycleToTx     Generated when a transactional object is
                          returned to the pool
     COMSVCSEVENTINFO * pInfo
     REFGUID guidActivity     REFERENCES - OnActivityCreate
     REFGUID guidObject     CLSID for the objects in the pool
     REFGUID guidTx    REFERENCES OnTransactionStart
     ULONG64 objid    REFERENCES OnObjectCreate::ObjectID or
                                  OnObjectActivate::ObjectID,
                                  OnObjPoolGetFromTx::objid,
                                  OnObjectConstruct::objid
OnObjPoolGetFromTx      Generated when a transactional object
                          is obtained from the pool
     COMSVCSEVENTINFO * pInfo
     REFGUID guidActivity     REFERENCES - OnActivityCreate
     REFGUID guidObject     CLSID for the objects in the pool
     REFGUID guidTx    REFERENCES OnTransactionStart
     ULONG64 objid    KEY - unique pooled object ID
OnObjPoolCreateObject      Generated when an object is created for
                          the pool
     COMSVCSEVENTINFO * pInfo
     REFGUID guidObject     CLSID for the objects in the pool
     DWORD dwAvailable      Number of objects in the Pool
     ULONG64 objid    REFERENCES OnObjPoolCreateObject
OnObjPoolCreateDecision      Generated when the pool must decide to give
                          out an existing object or create a new one
     COMSVCSEVENTINFO * pInfo
     DWORD dwThreadsWaiting    Number of threads waiting for
                                  an object
```

TABLE 11-continued

COM+ Object Pooling Metrics

```
     DWORD dwAvail     Number of free objects in the pool
     DWORD dwCreated    Number of total objects in the pool
     DWORD dwMin       Pool's Min object value
     DWORD dwMax       Pool's Max object value
OnObjPoolTimeout    Generated when the request for a pool object
                          times out
     COMSVCSEVENTINFO * pInfo
     REFGUID guidObject     CLSID for the objects in the pool
     REFGUID guidActivity     REFERENCES - OnActivityCreate
     DWORD dwTimeout   Pool's timeout value
OnObjPoolCreatePool       Generated when a new pool is created
     COMSVCSEVENTINFO * pInfo
     REFGUID guidObject     CLSID for the objects in the pool
     DWORD dwMin       Pool's Min object value
     DWORD dwMax       Pool's Max object value
     DWORD dwTimeout   Pool's timeout value
OnObjectConstruct   Generated for when a Constructed object is created
     COMSVCSEVENTINFO * pInfo
     REFGUID guidObject     CLSID for the objects in the pool
     LPCOLESTR sConstructString     Object construction string
     ULONG64 oid      KEY - the unique identifier for this object
```

TABLE 12

Queued Components Metrics

```
OnQCRecord Generated when the QC recorder creates the queued
                          message
     COMSVCSEVENTINFO * pInfo
     ULONG64 objid      REFERENCES OnObjectCreate::ObjectID,
                                  OnObjectActivate::ObjectID,
                                  OnObjPoolGetFromTx::objid,
                                  OnObjectConstruct::objid or
                                  OnObjPoolGetObject - object
                                  whose method calls are
                                  being queued
     WCHAR szQueue    MSMQ Queue name
     REFGUID guidMsgIdKEY - Unique message ID for this
                                  queued message
     REFGUID guidWorkFlowId Reserved
     HRESULT msmqhr    MSMQ return status for queue message
OnQCQueueOpen    Generated when the queue for a QC queue is opened
                          (used to generated the QueueID)
     COMSVCSEVENTINFO * pInfo
     WCHAR szQueue    MSMQ Queue name
     ULONG64 QueueID    KEY - unique identifier for queue
     HRESULT hr Status from MSMQ queue open
OnQCReceive Generated for a successful de-queuing of a message
                          (although QC might find something wrong
                          with the contents)
     COMSVCSEVENTINFO * pInfo
     ULONG64 QueueID    REFERENCE OnQCQueueOpen
     REFGUID guidMsgIdREFERENCE - OnQCRecord
     REFGUID guidWorkFlowId    Reserved
     HRESULT hr Status from QC processing of received message
OnQCReceiveFail   Generated when the receive message fails
     COMSVCSEVENTINFO * pInfo
     ULONG64 QueueID    REFERENCE OnQCQueueOpen
     HRESULT msmqhr    status from MSMQ receive message
OnQCMoveToReTryQueue    Generated when a message is moved to a
                          QC retry queue
     COMSVCSEVENTINFO * pInfo
     REFGUID guidMsgIdREFERENCE - OnQCRecord
     REFGUID guidWorkFlowId    Reserved
     ULONG RetryIndex    Which retry queue to move to
OnQCMoveToDeadQueue    Generated when a message cannot be
                          delivered
     COMSVCSEVENTINFO * pInfo
     REFGUID guidMsgIdREFERENCE - OnQCRecord
     REFGUID guidWorkFlowId Reserved
OnQCPlayback     Generated when a message's contents are replayed
     COMSVCSEVENTINFO * pInfo
     ULONG64 objid      REFERENCES OnObjectCreate::ObjectID,
                                  OnObjectActivate::ObjectID,
```

TABLE 12-continued

Queued Components Metrics

|  |
| --- |
| OnObjPoolGetFromTx::objid, OnObjectConstruct::objid or OnObjPoolGetObject - object playing back the QC messages |
| REFGUID guidMsgIdREFERENCE - OnQCRecord |
| REFGUID guidWorkFlowId    Reserved |
| HRESULT hr Status from MSMQ receive message |

TABLE 13

Component Exception Metrics

| | |
| --- | --- |
| OnExceptionUser | Generated for transactional components when a user exception is encountered |
| | COMSVCSEVENTINFO * pInfo |
| | ULONG code Exception code |
| | ULONG64 address    Address of Exception |
| | LPCOLESTR pszStackTrace Stack trace |

TABLE 14

User Defined Event Metrics

| | |
| --- | --- |
| OnUserEvent | Provided for User components to generate user specific metrics |
| | COMSVCSEVENTINFO * pInfo |
| | VARIANT * pvarEvent    User defined content |

TABLE 15

STA Thread Pool Metrics

| | |
| --- | --- |
| OnThreadStart | Generated when a new STA (Single Threaded Apartment) thread is created |
| | COMSVCSEVENTINFO * pInfo |
| | ULONG64 ThreadID KEY - unique thread identifier |
| | DWORD dwThread    WINDOWS 2000 thread ID |
| | DWORD dwThreadCnt    Number of threads in STA thread pool |
| OnThreadTerminate | Generated when an STA thread is terminated |
| | COMSVCSEVENTINFO * pInfo |
| | ULONG64 ThreadID REFERENCES OnThreadStart |
| | DWORD dwThread    WINDOWS 2000 thread ID |
| | DWORD dwThreadCnt    Number of threads in the STA thread pool |
| OnThreadBindToApartment | Generated when an STA thread needs an apartment (thread) to run in. Either allocates one from the pool or creates one |
| | COMSVCSEVENTINFO * pInfo |
| | ULONG64 ThreadID REFERENCES OnThreadStart |
| | ULONG64 AptID    Apartment ID |
| | DWORD dwActCnt    Number of activities bound to this apartment |
| | DWORD dwLowCnt Reserved - currently 0 |
| OnThreadUnBind | Generated when the apartment (thread) is no longer needed |
| | COMSVCSEVENTINFO * pInfo |
| | ULONG64 ThreadID REFERENCES OnThreadStart |
| | ULONG64 AptID    REFERENCES OnThreadAssignApartment |
| | DWORD dwActCnt    Number of activities active on the Apartment (thread) |
| OnThreadAssignApartment | Generated when an activity is assigned to an apartment (thread) |
| | COMSVCSEVENTINFO * pInfo |
| | REFGUID guidActivity    REFERENCES OnActivityCreate |
| | ULONG64 AptID    KEY - unique apartment ID |
| OnThreadUnassignApartment | Generated when the activity is no longer associated with that apartment (thread) |
| | COMSVCSEVENTINFO * pInfo |
| | ULONG64 AptID    REFERENCES OnThreadAssignApartment |

Alerts

The illustrated exemplary architecture accommodates a set of rules considered when issuing alerts. The alerts can take the form of scripts. For example, a payroll administrator observes that 20 percent of transactions are aborting. After further investigation, she learns that the transactions are aborting due to an expired password. A similar situation occurred six months ago when passwords expired at the end of a six-month password rotation cycle.

Consequently, the administrator configures a rule to run a script whenever payroll transactions abort over the 15 percent level. The script acquires information on authentication failures and sends an advisory email to the password administrator if authentication failures are the cause of the failed transactions.

The scripts can be further used to start an application at a computer. For example, an organization has ten servers; five servers normally run a web application to process customer credit card orders from a web page, and five normally run an in-house application to process telephone orders as entered by staff. After the telephone order center closes, the application manager detects that the load on the in-house application has dropped dramatically; meanwhile, orders from the web page are beginning to overwhelm the five servers running the web application. The application manager can execute a script to start the web application on one or more of the five servers normally running the in-house application and shut down the in-house application on those servers if desired.

Generating Notifications in the Exemplary Architecture

Figure 16:
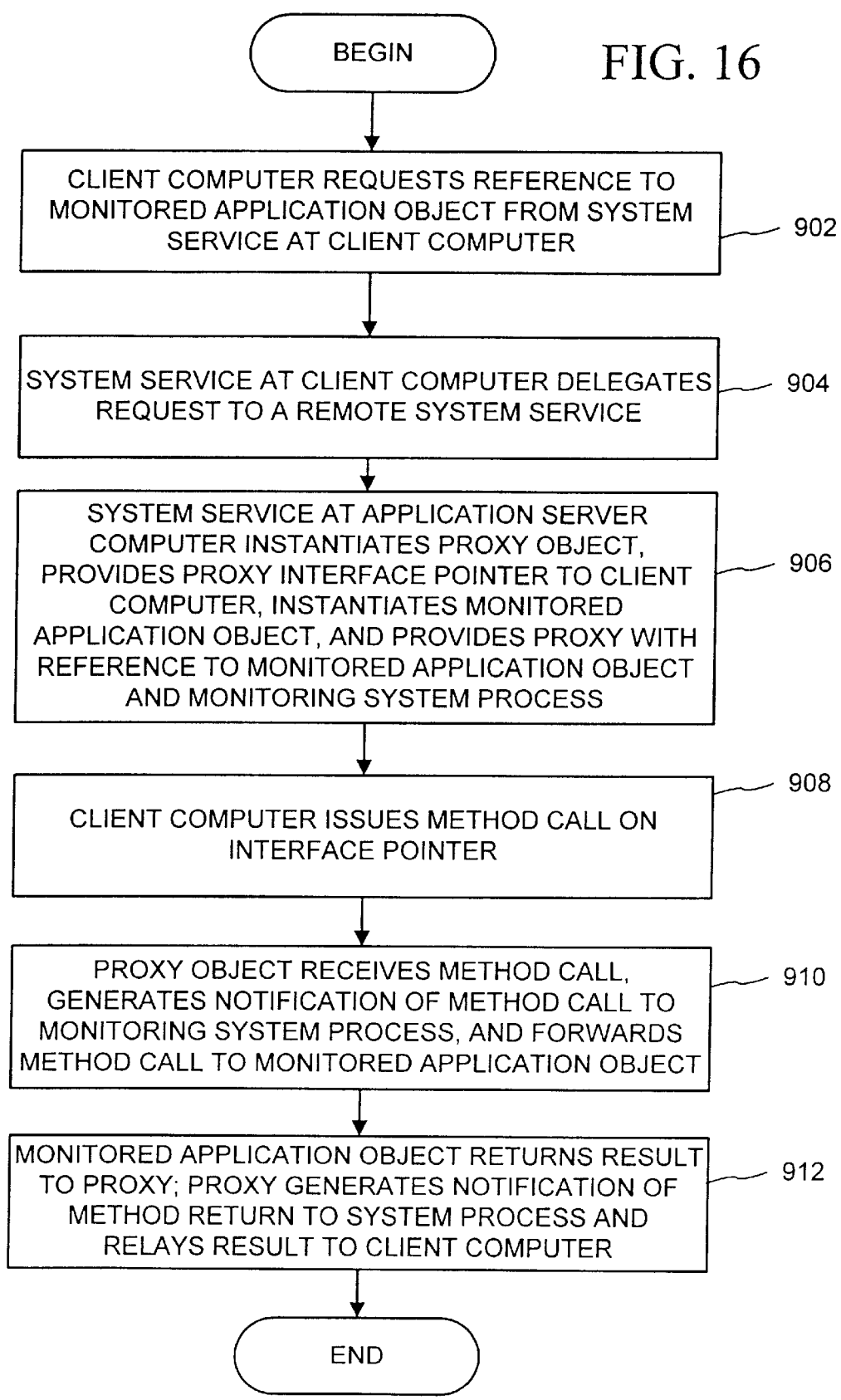
FIG. 16 is a flowchart showing a method for generating notifications for monitoring an object transparently to the monitored object.

FIG. 16 shows a method for generating notifications in the exemplary architecture. A client computer 302 (FIG. 5) requests a reference to a monitored application object from a system service at the client computer (box 902). Responsive to the request, the system service at the client computer delegates the request to a remote system service (box 904). The remote system service could be a service at a server computer (e.g., 306) or at a load balancing computer (e.g., a router), which forwards the request to an appropriate server. Responsive to the delegation, the system service at the server 306 instantiates a proxy object 310, provides a proxy interface pointer to the client computer 302, instantiates the monitored application object 312, and provides the proxy 310 with a reference to the monitored application object 312 and the publisher (e.g., publisher 510 in FIG. 9) in the system process 320 (box 906).

The client computer 302 then issues a method call on the interface pointer provided to it by the object creation service (box 908). The proxy object 310 intercepts the method call, generates a notification of the method call to the monitoring system process 320, and forwards the method call to the monitored application object 312 (box 910).

The monitored application object 312 returns the result of the method call to the proxy 310, which generates a notification indicating the method call has returned and relays the result to the client computer 302 (box 912).

Fielding Notifications in the Exemplary Architecture

Figure 17:
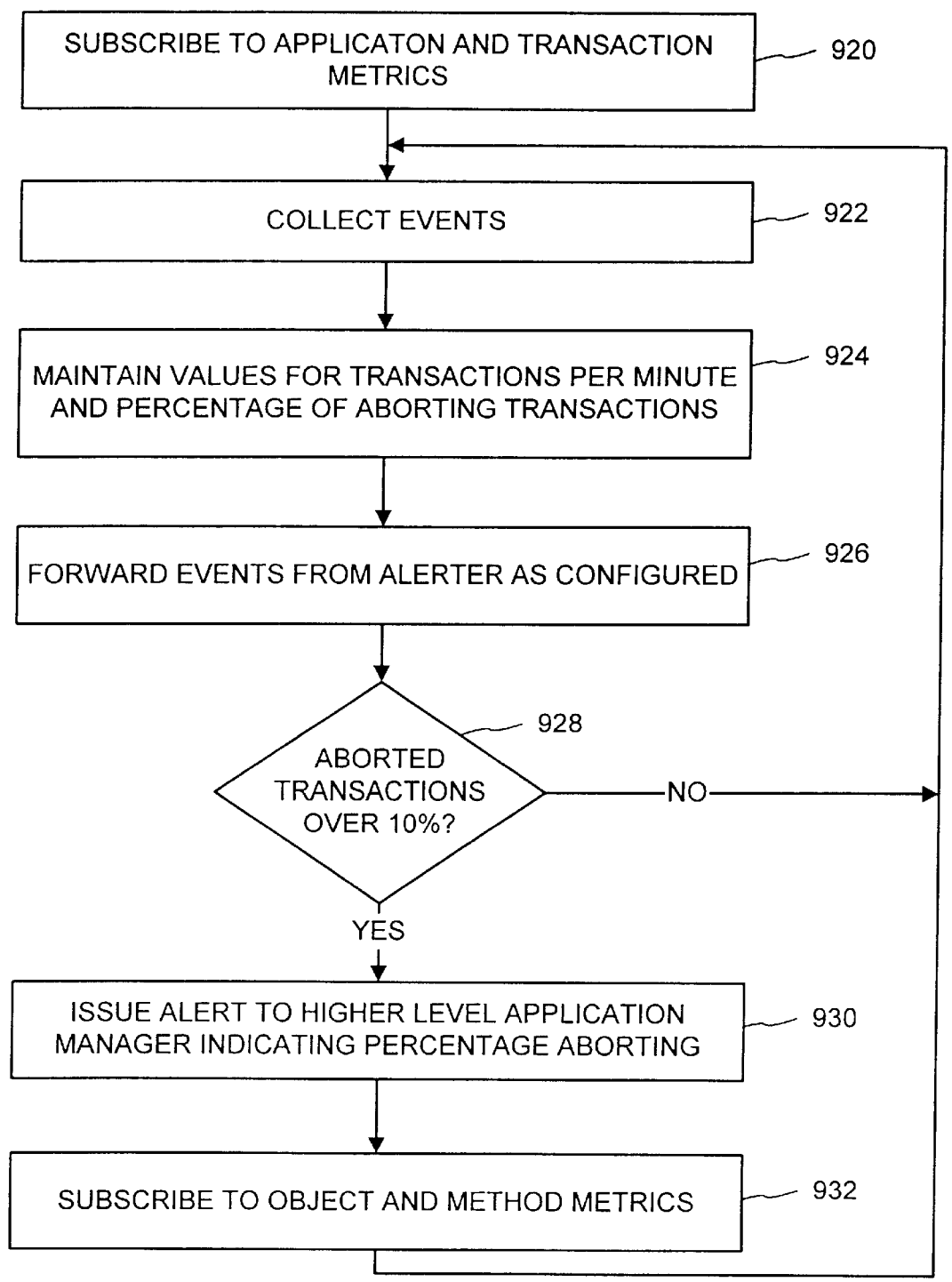
FIG. 17 is a flowchart showing a method for collecting events generated by a method such as that shown in FIG. 16 and dynamically selecting monitored operation management metrics.

FIG. 17 illustrates a method for acquiring and fielding the notifications generated by the method of FIG. 16. An application manager 340 (FIG. 5) subscribes to application and transaction metrics (box 920). As the system process 320 publishes events, they are collected (box 922). The application manager 340 maintains values for transactions per minute and percentage of aborting transactions (box 924). The application manager's alerter 344 can forward various events or generate new ones as configured (box 926). If the percentage of aborted transactions exceeds 10 percent (box 928), the alerter 344 issues an alert to a higher level application manager indicating the percentage of transactions aborting (box 930) and subscribes to additional metrics (i.e., object and method metrics) (box 932).

Figure 18:
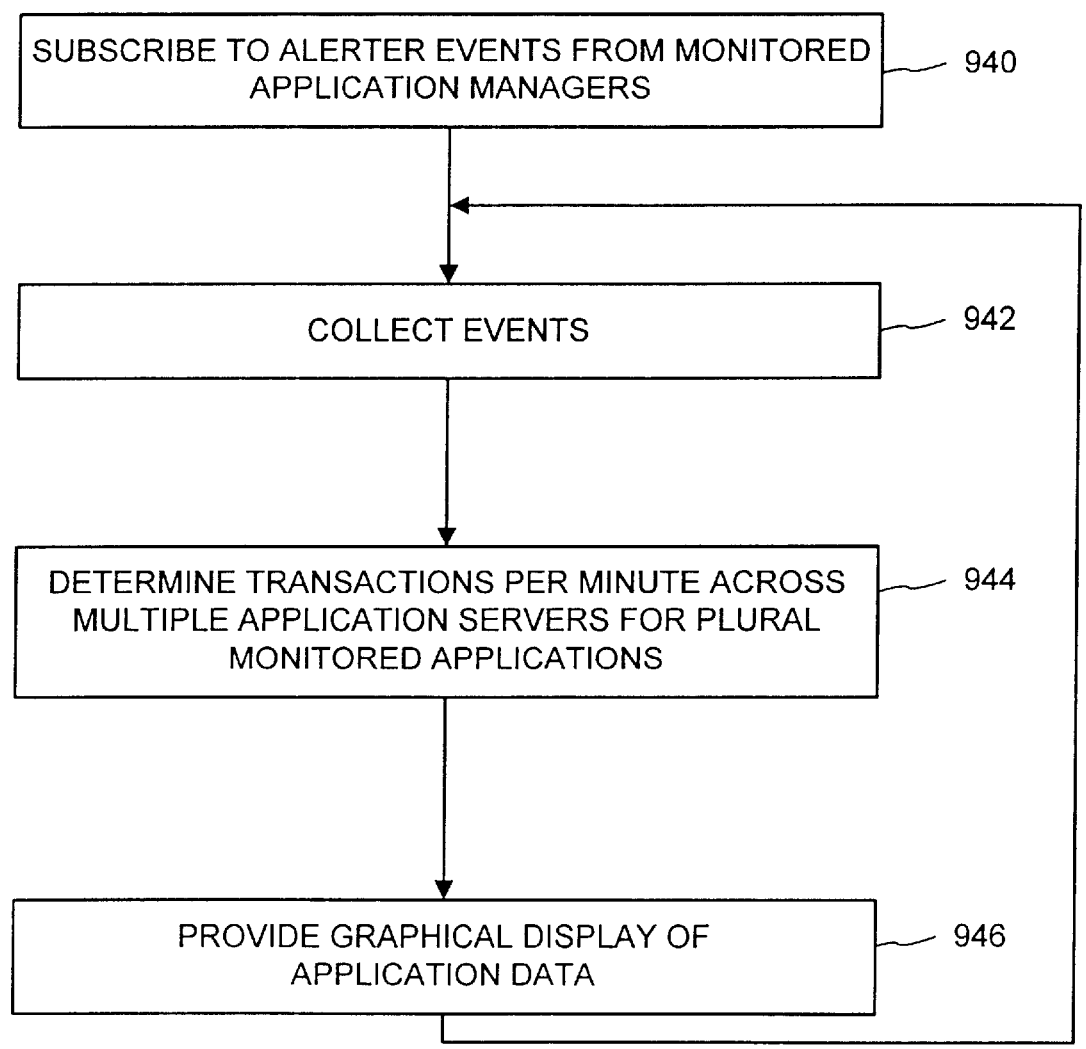
FIG. 18 is a flowchart showing a method for collecting events generated by a method such as that shown in FIG. 16 and providing program information for a program scattered across multiple application servers.

The example of FIG. 17 could be varied in many ways to monitor a variety of other rules instead of rules associated with aborting transactions. For example, the application manager could monitor the number of transactions per minute across a set of application servers. For example, FIG. 18 shows an arrangement in which a higher level application manager 360 subscribes to events from monitored application managers (e.g., application managers at computers 304 and 306) (box 940). The events are collected and logged (box 942). Plural events are combined to determine the number of transactions per minute across plural computers for the monitored applications (box 944). A graphical display depicts application data (e.g., application availability) (box 946).

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In an execution environment accommodating software objects, a method of monitoring the execution of software comprising a set of at least two software objects, the method comprising:

at run time of the software, observing at least one object-related operation associated with a first monitored software object out of the set;

responsive to said observation of the at least one object-related operation associated with the first monitored software object, generating a first notification indicative of the at least one object-related operation associated with the first monitored software object;

at run time of the software, observing at least one object-related operation associated with a second monitored software object out of the set;

responsive to said observation of the at least one object-related operation associated with the second monitored software object, generating a second notification indicative of the at least one object-related operation associated with the second monitored software object; and performing a calculation on the first notification and the second notification to determine an operational management metric indicative of performance of the software.

2. The method of claim 1 wherein said observing at least one object-related operation associated with a first monitored software object is performed by an object operation monitor placed at the object at run time of the software.

3. The method of claim 1 wherein:

said observing at least one object-related operation associated with a first monitored software object is performed by a first object operation monitor placed at the object at run time of the software; and said observing at least one object-related operation associated with a second monitored software object is performed by a second object operation monitor placed at the object at run time of the software.

4. The method of claim 1 wherein the object-related operations comprise:

object creation;

object method calling;

method exception generation;

object activation; and queuing a method call.

5. The method of claim 1 further comprising:

determining whether the operational management metric has fallen outside a specified range; and generating an alert responsive to determining the operational management metric has fallen outside a specified range.

6. The method of claim 1 wherein:

the software objects in the set of software objects are software objects performing work for a monitored program; and the operational management metric indicates performance of the monitored program.

7. The method of claim 6 further comprising:

storing the first notification and the second notification with other notifications in a log to track history of execution of the monitored program, each notification having an identifier identifying the monitored program to differentiate it from notifications associated with programs other than the monitored program.

8. The method of claim 1 wherein:

the software objects in the set of software objects are application software objects performing work for a single application; and the operational management metric indicates performance of the application.

9. The method of claim 1 wherein:

the notifications include a reference to an activity for which the object-related operations were performed; and the calculation generates an operational management metric indicative of software performance with respect to the activity.

10. In an execution environment accommodating software objects, a method of monitoring the execution of a program comprising a set of software objects, the method comprising:

at run time, wrapping a monitored software object out of the set to monitor at least one operation performed at the monitored software object;

generating a notification indicative of the at least one operation performed at the monitored software object;

collecting the notification with other notifications indicating operations performed at the software objects into a set of notifications; and performing a calculation on the set of notifications to generate an operational management metric indicative of program performance.

11. The method of claim 10 wherein:
the notification includes a reference to an activity for which the at least one operation was performed; and
the calculation generates an operational management metric indicative of program performance with respect to the activity.

12. The method of claim 10 wherein the notification includes a reference to a program for which the at least one operation was performed.

13. The method of claim 10 wherein the wrapping action comprises interposing, at run time, a proxy object between the monitored software object and a client program performing a method call on the monitored software object by providing the client program with a reference to the proxy object instead of the monitored software object, wherein the proxy object is operative to forward the method call to the monitored software object.

14. The method of claim 10 wherein the wrapping action comprises interposing, at run time, a proxy object between the monitored software object and a client program performing an operation on the monitored software object.

15. The method of claim 10 wherein the operation performed at the monitored software object is a method call sent from a client program to the monitored software object, and the notification indicates the method call.

16. The method of claim 10 wherein:
the generating action comprises publishing the notification as an event indicative of the at least one operation performed at the monitored software object in a loosely coupled publish and subscribe model; and
the collecting action comprises subscribing to the notification in a loosely coupled publish and subscribe model.

17. The method of claim 16 wherein:
said subscribing to the notification is performed at run time responsive to a monitored condition of the program.

18. The method of claim 16 wherein:
said subscribing to the notification is performed at run time in response to transactions for the program aborting over a specified threshold percentage.

19. The method of claim 10 wherein the notifications are collected at a first software manager in an enterprise application management hierarchy, the method further comprising:
selectively forwarding the operational management metric to a second software manager having a higher position in the enterprise software management hierarchy.

20. The method of claim 19 wherein the operational management metric is a first operational management metric measuring operation of the program at a first computer, the method further comprising:
collecting, at the second software, a second operational management metric measuring operation of the program at a second computer; and
combining the first operational management metric and the second operational management metric to generate an operational management metric indicative of performance of the program at the first computer and the second computer.

21. In an execution environment accommodating software objects, a method of monitoring the execution of a set of a plurality of programs, each program in the set comprising a plurality of software objects, the method comprising:
at run time, intercepting interactions with the software objects of the programs;
generating notifications indicating the interactions and programs responsible for the notifications;
grouping, by program, a plurality of the notifications into sets of notifications for the programs; and
generating operational management information indicative of performance of the programs by performing a calculation on the sets of notifications.

22. The method of claim 21 wherein:
a client program executing in a process is responsible for generating at least one of the notifications; and
a program responsible for an interaction is determined as a program associated with a first software object instantiated in the process responsible for generating at least one of the notifications.

23. The method of claim 21 further comprising:
when the software objects access a system service, generating notifications from the system service; and
including the notifications from the system service in the sets of notifications.

24. The method of claim 21 wherein the notifications are published according to a loosely coupled publish and subscribe model, the method further comprising:
designating an operation type for the operations;
publishing the notifications as events of a type associated with the operation type;
subscribing to a first subset of the events by specifying a first event type;
determining a program condition at run time; and
responsive to determining the program condition, subscribing to a second subset of the events by specifying a second event type.

25. In an object execution environment, a method of instrumenting an application at run time to monitor application performance, wherein the application comprises a set of plural application objects, the method comprising:
interposing an object operation monitor between an application object associated with one of the applications and a client of the application object, wherein the object operation monitor is operative responsive to interactions between the client and the application object to generate notifications;
monitoring interactions with the application object with the object operation monitor to generate a notification when the client program accesses the functionality of the application object, wherein the notification contains information for identifying the application associated with the application object;
grouping the notification with at least one other notification containing information identifying a same application into a set of notifications; and
calculating an application performance metric from the set of notifications.

26. The method of claim 25 wherein the object operation monitor is a proxy object for the application object operative to intercept method invocations on the application object and method returns by the application object.

27. The method of claim 25 wherein the object operation monitor is a wrapper for an interface of the application object operative to intercept method invocations on the application object and method returns by the application object.

28. The method of claim 25 wherein the object operation monitor is an object wrapper for the application object operative to intercept a method invocation on the application object and forward the intercepted method invocation to the object and further operative to intercept a method return by the application object and forward the intercepted method return.

29. A computer-implemented method of collecting operational management information for a monitored object-based program comprising a set of at least one monitored software object, the method comprising:

receiving a request from a client program for a reference to a monitored software object in the set;

responsive to the request from a client program for a reference to the monitored software object, providing to the client program a reference to a proxy object to thereby intercept client program action requests on the monitored software object, the proxy object operative responsive to a request for an action on the provided reference to forward the request for action on the software object and to direct a notification indicative of the action;

responsive to a run time request issued by the client program on the provided reference for the monitored software object to perform a requested action, intercepting the request in the proxy object to direct a notification indicative of the requested action to a software manager; and forwarding the request to perform a requested action on the monitored software object to the monitored software object.

30. The method of claim 29 wherein the monitored program subscribes to the notification in a loosely coupled publish and subscribe model.

31. The method of claim 29 further comprising:

performing an evaluation on the notification directed to the software manager in combination with other notifications directed to the software manager to produce an operational management metric, wherein the other notifications are associated with the monitored object-based program via a program identifier.

32. The method of claim 31 wherein the program identifier is an application identifier.

33. The method of claim 29 wherein:

the monitored software object presents a first interface having a method;

the proxy object presents a second interface accommodating a call to the method; and wherein the reference to the proxy object is a reference to the second interface.

34. A method of monitoring the performance of a program comprising a set of software objects, the method comprising:

in a configuration store, designating at least one of the objects in the set of software objects as monitored;

at program run time, when providing an interface of an object to a client of the object, consulting the configuration store to determine whether the object is designated as monitored;

at program run time, monitoring operation of objects determined to be designated as monitored by observing interactions with the objects determined to be designated as monitored; and responsive to the monitoring action, analyzing the interactions to report performance of the program.

35. The method of claim 34 wherein the interactions with the objects comprise method calls on the objects.

36. The method of claim 34 wherein the set of software objects perform work for a software application.

37. A computer-implemented method of managing a set of object-based programs by collecting operational management information to monitor performance of the set of object-based programs, each of the programs in the set comprising a plurality of monitored software objects, the method comprising:

in a runtime environment comprising an object request service and accommodating execution of objects, receiving a runtime request for a reference to an interface of a monitored software object belonging to a program out of the set of object-based programs, the interface of the monitored software object having at least one method for performing a task requested of the monitored software object;

responsive to the runtime request, providing, in place of a reference to an interface of the monitored software object, a reference to an interface of a proxy object associated with the monitored software object, the interface of the proxy object accommodating a call to the at least one method for performing a task requested of the monitored software object and operative to forward a method call to the at least one method to the monitored software object;

at runtime, intercepting method calls on the monitored software object at the proxy object to direct a first notification indicative of the method call to a software manager and forward the method call to the monitored software object;

analyzing the first notification and a second notification generated by another proxy object to generate operational management information comprising at least one metric indicative of program performance; and monitoring the metric to generate an alert when the metric falls outside a threshold.

38. The method of claim 37, wherein the notification is directed to the software manager by publishing an event according to a loosely coupled publish and subscribe scheme.

39. The method of claim 38 further comprising:

responsive to the alert, automatically subscribing to additional events to generate more detailed operational management information.

40. The method of claim 38 further comprising:

responsive to the alert, automatically starting one of the set of programs at a server computer.

41. The method of claim 37, wherein the notification is directed to the software manager via an intermediary agent, wherein the intermediary agent publishes an event for subscription by the software manager according to a loosely coupled event scheme.

42. The method of claim 41 wherein the program comprises a subscriber to the event.

43. The method of claim 41 wherein the software manager is a first software manager in communication with a second, higher level, software manager monitoring program execution at plural computers, the method further comprising:

sending notifications from the first software manager to the second software manager.

44. A software management system for monitoring execution of an object-based program comprising a set of monitored software objects, the management system comprising:

an object operation monitor interposed between a calling client program and a monitored software object out of the set at run time, wherein the calling client program accesses the functionality of the monitored software object, wherein the object operation monitor is operative to generate a notification responsive to a request for an operation at the monitored software object by the calling client program;

a software manager operative to receive the notification generated by the object operation monitor and further operative to combine the notification with another notification generated by another object operation monitor associated with an object in the set to generate an operational management metric; and an alerter operative to generate an alert when the operational management metric falls outside a specified threshold.

45. The software management system of claim 44 wherein the object operation monitor is further operative to generate a notification responsive to a result provided by the monitored software object to the client program.

46. The software management system of claim 44 further comprising:

a publisher operative to publish an event responsive to the notification generated by the object operation monitor, wherein the software manager comprises a subscriber to the event.

47. The software management system of claim 46 wherein the publisher and subscriber are loosely coupled.

48. The software management system of claim 47 wherein the software manager is a first software manager comprising a first subscriber, the system further comprising:

a second software manager comprising a second subscriber to the event, wherein the publisher and the second subscriber are loosely coupled.

49. The software management system of claim 44 wherein the alerter is further operative to issue an alert to a software manager at a higher location in a software manager hierarchy monitoring program execution at a plurality of computers.

50. In a computer system for executing software objects, an enterprise software management system for monitoring the execution of a plurality of programs, wherein at least one of the programs executes on a plurality of computers, the enterprise software management system comprising:

means for intercepting an operation to be performed at an object at runtime to forward the operation to the object and to generate a notification indicative of the operation to be performed;

means for collecting the notifications into a set of notifications for a particular program out of the plurality of programs;

means for monitoring the set of notifications to detect a program condition; and means for generating an alert responsive to the means for monitoring.

51. The enterprise software management system of claim 50 further comprising:

means for publishing the notification in a loosely coupled publish and subscribe model.

52. A computer-readable medium having computer-executable instructions for performing, in an execution environment accommodating software objects, a method of monitoring the execution of a program comprising a set of software objects, the method comprising:

at run time, wrapping a monitored software object out of the set to monitor at least one operation performed at the monitored software object;

generating a notification indicative of the at least one operation performed at the monitored software object;

collecting the notification with other notifications indicating operations performed at the software objects into a set of notifications; and performing a calculation on the set of notifications to generate an operational management metric indicative of program performance.

53. A computer-readable medium having computer-executable instructions for performing a method of managing a set of object-based programs by collecting operational management information to monitor performance of the set of object-based programs, each of the programs in the set comprising a plurality of monitored software objects, the method comprising:

in a runtime environment comprising an object request service and accommodating execution of objects, receiving a runtime request for a reference to an interface of a monitored software object belonging to a program out of the set of object-based programs, the interface of the monitored software object having at least one method for performing a task requested of the monitored software object;

responsive to the runtime request, providing, in place of a reference to an interface of the monitored software object, a reference to an interface of a proxy object associated with the monitored software object, the interface of the proxy object accommodating a call to the at least one method for performing a task requested of the monitored software object and operative to forward a method call to the at least one method to the monitored software object;

at runtime, intercepting method calls on the monitored software object at the proxy to direct a first notification indicative of the method call to a software manager and forward the method call to the monitored software object;

analyzing the first notification and a second notification generated by another proxy object to generate operational management information comprising at least one metric indicative of program performance; and monitoring the metric to generate an alert when the metric falls outside a threshold.

54. A software management system for managing the execution of an object-based program comprising a set of software objects, the management system comprising:

an instrumented object execution environment operative to receive a request to perform an interaction with one of the software objects and, responsive to the request, direct a notification indicative of the interaction to a program execution monitor, wherein the notification is directed to the software execution monitor via a loosely coupled publish and subscribe model; and the program execution monitor, operative to receive the notification indicative of the interaction from the instrumented object execution environment and further operative to receive other notifications indicative of other interactions and combine the notification and the other notifications to generate an operational management metric.

55. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the software object has a plurality of methods, wherein the at least one operation performed at the monitored software object is a call to one of the plurality of methods of the software object, and wherein the notification indicates the one of the plurality of methods.

56. The method of claim 55 wherein the notification further indicates a value of at least one parameter associated with the call to one of the plurality of methods of the software object.

57. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the software object has at least one method, wherein the at least one operation performed at the monitored software object is a call to the method of the software object with at least one parameter having a value, and wherein the operational management metric indicates the value of the at least one parameter.

58. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the software object has a plurality of methods, wherein the at least one operation performed at the monitored software object is a return by the software object from a call to one of the plurality of methods by a client of the software object, and wherein the notification indicates occurrence of the return.

59. The method of claim 58 wherein the notification further indicates at least one value associated with the return by the software object.

60. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the notification is published in a loosely coupled publish and subscribe model.

61. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the notification is published in a loosely coupled publish and subscribe model and subscribed to by a plurality of subscribers.

62. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the software object is of an object class and the object operation monitor is interposed between the monitored software object and a client of the monitored software object responsive to a request by the client for a newly-created instance of a software object of the object class.

63. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the object operation monitor is a proxy object interposed between the monitored software object and a client of the monitored software object.

64. In an execution environment accommodating software objects, a method of monitoring the execution of a software object, wherein the software object is operable as a component part of a program, the method comprising:

at run time, placing an object operation monitor at the software object to monitor at least one operation performed at the monitored software object;

responsive to observation of the at least one operation by the object operation monitor, generating a notification indicative of the at least one operation performed at the monitored software object; and monitoring the notification to determine an operational management metric associated with the monitored software object;

wherein the object operation monitor is a wrapper interposed between an interface of the monitored software object and a client of the monitored software object.

65. In an execution environment accommodating software objects, a method of monitoring the execution of a software object, wherein the software object is operable as a component part of a program, the method comprising:

at run time, placing an object operation monitor at the software object to monitor a first operation performed at the monitored software object;

responsive to observation of the first operation by the object operation monitor, generating a first notification indicative of the first operation performed at the monitored software object;

monitoring the first notification to determine an operational management metric associated with the monitored software object;

generating a second notification indicative of a second operation performed at the monitored software object; and performing a calculation on the first notification and the second notification to determine an operational management metric indicative of performance of the software object.

66. The method of claim 65 wherein the first operation is a method call on the monitored software object and the second operation is a method return by the monitored software object.

* * * * *